(12) United States Patent
Kelly et al.

(10) Patent No.: US 9,575,962 B2
(45) Date of Patent: *Feb. 21, 2017

(54) METHOD, SYSTEM AND APPARATUS FOR ASSEMBLING A RECORDING PLAN AND DATA DRIVEN DIALOGS FOR AUTOMATED COMMUNICATIONS

(71) Applicant: SPLICE SOFTWARE INC., Calgary (CA)

(72) Inventors: Tara Kelly, Calgary (CA); Andrew Hamill, Calgary (CA); Ken Hackl, Calgary (CA)

(73) Assignee: SPLICE SOFTWARE INC., Calgary, AB (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/152,312

(22) Filed: May 11, 2016

(65) Prior Publication Data
US 2016/0253316 A1 Sep. 1, 2016

Related U.S. Application Data

(63) Continuation of application No. 14/210,912, filed on Mar. 14, 2014, now Pat. No. 9,348,812.

(51) Int. Cl.
*G10L 13/00* (2006.01)
*G10L 13/06* (2013.01)
(Continued)

(52) U.S. Cl.
CPC ......... *G06F 17/2785* (2013.01); *G06F 17/218* (2013.01); *H04M 3/42221* (2013.01); *H04M 3/4936* (2013.01)

(58) Field of Classification Search
None
See application file for complete search history.

(56) References Cited

U.S. PATENT DOCUMENTS 7,502,739 B2 * 3/2009 Saito ................... G10L 13/10
704/260
8,165,881 B2 * 4/2012 Kirsch ................ B60R 16/0373
704/260

(Continued)

OTHER PUBLICATIONS

Kelly, Tara, et al., "Method, System and Apparatus for Assembling a Recording Plan and Data Driven Dialogs for Automated Communications", U.S. Appl. No. 14/210,912, filed Mar. 14, 2014. Now U.S. Pat. No. 9,348,812, issued May 24, 2016.

*Primary Examiner* — Satwant Singh
(74) *Attorney, Agent, or Firm* — Perry + Currier, Inc.

(57) ABSTRACT

Method, system and apparatus for assembling a recording plan and data driven dialogs for automated communications are provided. At a computing device comprising a memory, a communication interface and a processor, the memory storing a database of statements comprising one or more of first names, last names, greeting statements, sentiment statements, influence statements, call to action statements, and legal statements: one or more statements from the database are automatically assembled, via the processor, into one or more phrases to be recorded; instructions for applying linguistic rules are associated with the one or more phrases, via the processor, including where to insert pauses in the one or more phrases; and, the recording plan, comprising the one or more phrases in association with the instructions, is stored at the memory.

20 Claims, 25 Drawing Sheets

(51) Int. Cl.
  *G10L 21/00*    (2013.01)
  *G06F 17/27*    (2006.01)
  *G06F 17/28*    (2006.01)
  *G06F 17/20*    (2006.01)
  *H04M 3/42*     (2006.01)
  *G06F 17/21*    (2006.01)
  *H04M 3/493*    (2006.01)

(56) References Cited

U.S. PATENT DOCUMENTS

| | | | |
|---|---|---|---|
| 8,195,594 B1 * | 6/2012 | Bryce | G06F 19/3487 706/47 |
| 8,599,836 B2 * | 12/2013 | Van Buren | H04M 3/4936 370/352 |
| 8,630,970 B2 * | 1/2014 | Bryce | G06F 19/3487 706/47 |
| 8,710,343 B2 * | 4/2014 | Kellett | G10H 1/38 700/94 |
| 8,798,996 B2 * | 8/2014 | Roloff | G10L 15/26 704/9 |
| 2012/0065957 A1 * | 3/2012 | Jungblut | G06F 17/2827 704/3 |
| 2015/0156327 A1 * | 6/2015 | Van Buren | H04M 3/4936 370/352 |

* cited by examiner

| Recorded Phrases |
| :---: |
| 148 |
| Tara |
| Andrew |
| Kelly |
| Hamill |
| Hi |
| As a new customer |
| You are a valued customer, and we always appreciate your confidence in our products |
| You are a long time customer, and we value your business. |
| There is a sale on this weekend. |
| To opt out of future calls, press 1 |
| To opt out of future calls, call |
| In |
| Your |

Fig. 3

Customer Records
433

| Name | Address | Account# | Category | First Interaction | Last Interaction | #Interactions | Phone# | Expiry Date |
|---|---|---|---|---|---|---|---|---|
| Tara Kelly | 33 Robin St., Calgary, AB, CA | 1754 | Valued | May 2, 2001 | Feb. 10, 2014 | 47 | 4035551212 | Mar 5, 2014 |
| Andrew Hamill | 12 Main St., Calgary, AB, CA | 7908 | New | Feb 11, 2014 | Feb 11, 2014 | 1 | 4035551213 | Mar 6, 2014 |
| Ken Hackl | 17 First Ave, Calgary, AB, CA | 4056 | Long-time | Jan. 5, 2003 | March 2, 2013 | 7 | 4035551214 | Apr 2, 2014 |
| Julia Jones | 853 Yonge St., Detroit, MI, USA | 1399 | Valued | July 7, 1999 | Feb 12, 2014, | 84 | 3135551215 | Mar 7, 2014 |
| Claire Smith | 973 Cross St., Detroit, MI, USA | 1280 | Long-time | Sept 30, 1998 | July 7, 2013, | 16 | 3135551216 | May 5, 2014 |

Fig. 5

Campaign Data
537

Greeting Statements 505

Hi <FIRST NAME>, I'm calling from <ENTITY NAME> in <ENTITY LOCATION> regarding your <PRODUCT NAME> Software.

Sentiment Statements 507

New=Thanks for purchasing <PRODUCT NAME>; as a new customer, we hope you are finding it useful.

Valued=You are a valued customer, and we always appreciate your confidence in our products.

Long-time=You are a long time customer, and we value your business.

Influence/Call to Action Statements 509

Your <PRODUCT NAME> Software License is set to expire on <EXPIRY DATE>. To extend your license please, press 1 now and a customer service representative will call you back within <TIME PERIOD>.

Supplementary Data 513

<ENTITY NAME>= National Software

<ENTITY LOCATION> =Detroit

<PRODUCT NAME>= AlphaPro

Fig. 6

Campaign Data
637

Greeting Statements
605

Hi <FIRST NAME>,
This is <STORE MANAGER NAME>, store manager with <STORE NAME> in <STORE LOCATION>.

Sentiment Statements
607

New=Because you are a new customer, my staff and I would personally like to thank you for visiting our store, and for your business.
Valued=Because you are a valued customer, my staff and I would personally like to thank you for visiting our store, and for your business.
Long-time=Because you are a long-time customer, my staff and I would personally like to thank you for visiting our store, and for your business.

That's why we hope you'll accept <GIFT NAME> as our gift to you.

Influence Statements
609

You can pick up your gift this <DAY>, <DATE>, at our <STORE NAME> <EVENT NAME> Event.

Supplementary Data
613

<Store Name>
National Furniture

<STORE MANAGER NAME>
[LIST OF STORE MANAGER NAMES INDEXED BY STORE LOCATION]

<STORE LOCATION>
[LIST OF STORE LOCATIONS]

<GIFT NAME>
New=A Set of Steak Knives
Valued=A Set of Crystal Wine Glasses
Long time= A four piece dish set <Event Name>
VIP Thank You <Day><Date>
[Days and Dates Indexed by Store Location]

Fig. 7

Statements
142

First Names
201
Tara
Andrew
Ken
Julia
Claire

Last Names
203
Kelly
Hamill
Hackl
Jones
Smith

Greeting Statements
205
Hi

Hi <FIRST NAME>, I'm calling from <ENTITY NAME> in <ENTITY LOCATION> regarding your <PRODUCT NAME> Software.

Sentiment Statements
207
As a new customer

Thanks for purchasing <PRODUCT NAME>; as a new customer, we hope you are finding it useful.

You are a valued customer, and always appreciate your confidence in our products.

You are a long time customer, and we value your business.

Influence Statements (Call To Action Statements)
209
There is a sale on this weekend.

Your <PRODUCT NAME> Software License is set to expire on <EXPIRY DATE>. To extend your license, please press 1 now and a <customer service representative> will call you back <TIME PERIOD>.

Legal Statements
211
To opt out of future, calls press 1.

To opt out of future calls, call <LEGAL PHONE NUMBER>

Supplementary Data
213
<LEGAL PHONE NUMBER>
List of Phone Numbers by Jurisdiction National Software Detroit AlphaPro

Fig. 11

Recording Plan
1348

Ken

Julia

Claire

Hackl

Jones

Smith

I'm calling* from regarding your

Software

Thanks for purchasing as a new* customer [PAUSE] we hope* you are finding it useful*

Software License is set to expire* on

To extend your license [PAUSE] please press 1 now and a customer service representative will call you back National Software Detroit AlphaPro

[*=EMPHASIZE THESE WORDS]
[RECORD EACH PHRASE IN A WESTERN CANADIAN ACCENT]

Fig. 13

Recording Plan
1448

Ken

Julia

Claire

Hackl

Jones

Smith

I'm calling* from regarding your

Software

Thanks for purchasing as a new* customer [PAUSE] we hope* you are finding it useful*

Software License is set to expire* on

To extend your license [PAUSE] please press 1 now and a customer service representative will call you back National Software Detroit AlphaPro

[RECORD EACH PHRASE IN A US MIDWESTERN ACCENT]

Fig. 14

Recorded Phrases
148

| | |
|---|---|
| Tara | Ken |
| Andrew | Julia |
| Kelly | Claire |
| Hamill | Hackl |
| Hi | Jones |
| As a new customer | Smith |
| You are a valued customer, and we always appreciate your confidence in our products | I'm calling from |
| | regarding your |
| You are a long time customer, and we value your business. | Software |
| There is a sale on this weekend. | Thanks for purchasing |
| To opt out of future calls, press 1 | as a new customer we hope you are finding it useful |
| To opt out of future calls, call | Software License is set to expire on |
| In | To extend your license please press 1 now and a customer service representative will call you back |
| Your | |
| | National Software |
| | Detroit |
| | AlphaPro |

Fig. 16

Data Driven Dialogs
1901

4035551212: Hi Tara, I'm calling from National Software in Detroit regarding your AlphaPro Software. You are a valued customer, and we always appreciate your confidence in our products. Your AlphaPro Software License is set to expire on March 5, 2014. To extend your license please, press 1 now and a customer service representative will call you back within<TIME PERIOD>. To opt out of future calls, call 4035554321.

4035551213: Hi Andrew, I'm calling from National Software in Detroit regarding your AlphaPro Software. Thanks for purchasing AlphaPro; as a new customer, we hope you are finding it useful. Your AlphaPro Software License is set to expire on March 6, 2014. To extend your license please, press 1 now and a customer service representative will call you back within<TIME PERIOD>. To opt out of future calls, call 4035554321.

4035551214: Hi Ken, I'm calling from National Software in Detroit regarding your AlphaPro You are a long time customer, and we value your business. Your AlphaPro Software License is set to expire on April 2, 2014. To extend your license please, press 1 now and a customer service representative will call you back within<TIME PERIOD>. To opt out of future calls, call 4035554321.

3135551215: Hi Julia, I'm calling from National Software in Detroit regarding your AlphaPro Software. You are a valued customer, and we always appreciate your confidence in our products. Your AlphaPro Software License is set to expire on March 7, 2014. To extend your license please, press 1 now and a customer service representative will call you back within<TIME PERIOD>.

3135551216: Hi Claire, I'm calling from National Software in Detroit regarding your AlphaPro Software. You are a long time customer, and we value your business. Your AlphaPro Software License is set to expire on May 5, 2014. To extend your license please, press 1 now and a customer service representative will call you back within<TIME PERIOD>.

Fig. 19

METHOD, SYSTEM AND APPARATUS FOR ASSEMBLING A RECORDING PLAN AND DATA DRIVEN DIALOGS FOR AUTOMATED COMMUNICATIONS

CROSS-REFERENCE TO RELATED APPLICATION(S)

This application is a continuation application of U.S. patent application Ser. No. 14/210,912, filed Mar. 14, 2014, which is incorporated herein by reference.

FIELD

The specification relates generally to automated messaging systems, and specifically to a method, system and apparatus for assembling a recording plan and data driven dialogs for automated communications.

BACKGROUND

Assembling recordings for automated communications, such as interactive voice response (IVR) systems and human voice messaging systems, is currently quite limited, and the automated communication can sound stilted and/or unnatural, which leads to customers receiving the calls hanging up.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 1 depicts a device for assembling a recording plan and data driven dialogs for automated communications, according to non-limiting implementations.

FIG. 2 examples of statements to be used in a recording plan and/or a data driven dialog by the device of FIG. 1, according to non-limiting implementations.

FIG. 3 examples of recorded phrases to be used in a recording plan and/or a data driven dialog by the device of FIG. 1, according to non-limiting implementations.

FIG. 5 depicts an example of customer records used to generate a recording plan and/or data driven dialogs by the device of FIG. 1, according to non-limiting implementations.

FIG. 6 depicts an example of campaign data used to generate a recording plan and/or data driven dialogs by the device of FIG. 1, according to non-limiting implementations.

FIG. 7 depicts another example of campaign data used to generate a recording plan and/or data driven dialogs by the device of FIG. 1, according to non-limiting implementations.

FIG. 11 depicts the statements of FIG. 2 after being updated, according to non-limiting implementations.

FIG. 13 depicts an example of a recording plan, according to non-limiting implementations.

FIG. 14 depicts another example of a recording plan, according to non-limiting implementations.

FIG. 16 depicts recorded phrases stored at the device of FIG. 1 after a recording plan is implemented, according to non-limiting implementations.

FIG. 19 depicts examples of data driven dialogs, according to non-limiting implementations.

SUMMARY

Figure 1:
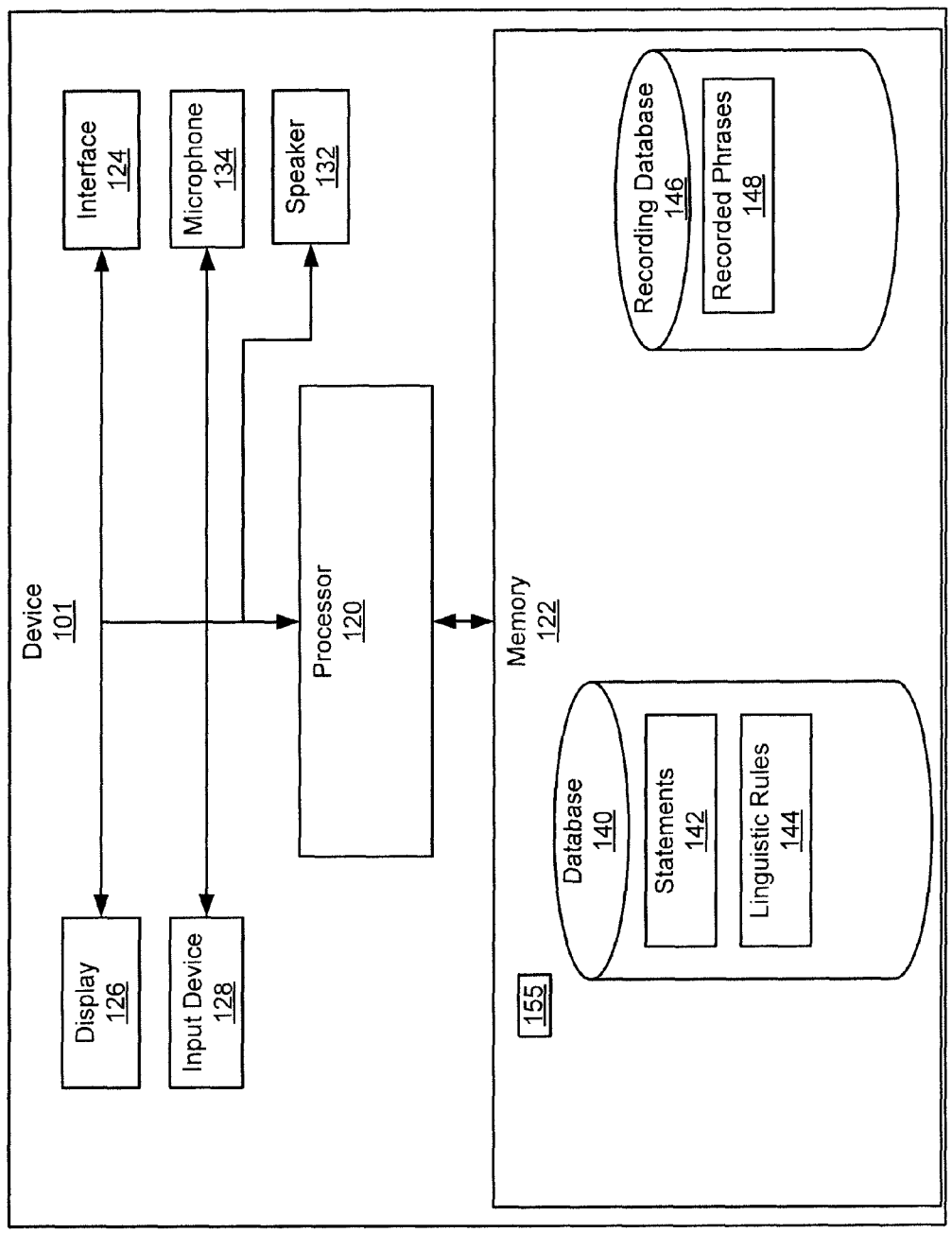

In general, this disclosure is directed to a system which assembles a recording plan according to linguistic rules, causes recordings of phrases in the recording plan to be recorded, and assembles data driven dialogs from the recordings in a one-to-one relationship with records in a customer database, the data driven dialogs comprising recordings to be deployed in a messaging system. For example, each data driven dialog is automatically customized for a given customer based on one or more customer fields in a customer database including, but not limited to, fields related to a value of the customer to an entity, such as a business, and a length of time that the customer has been engaged with the entity.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as connected physically, electronically, or any combination thereof, according to context. In general, components that are electrically connected are configured to communicate (that is, they are capable of communicating) by way of electric signals. According to context, two components that are physically coupled and/or physically connected may behave as a single element. In some cases, physically connected elements may be integrally formed, e.g., part of a single-piece article that may share structures and materials. In other cases, physically connected elements may comprise discrete components that may be fastened together in any fashion. Physical connections may also include a combination of discrete components fastened together, and components fashioned as a single piece.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XYY, YZ, ZZ, and the like). Similar logic can be applied for two or more items in any occurrence of "at least one . . . " and "one or more . . . " language.

An aspect of the specification provides a method of assembling a recording plan for an automated communication comprising: at a computing device comprising a memory, a communication interface and a processor, the memory storing a database of statements comprising one or more of first names, last names, greeting statements, sentiment statements, influence statements, call to action statements, and legal statements: automatically assembling, via the processor, one or more statements from the database into one or more phrases to be recorded; associating, via the processor, instructions for applying linguistic rules with the one or more phrases, including where to insert pauses in the one or more phrases; and, storing, at the memory, the recording plan comprising the one or more phrases in association with the instructions.

The method can further comprise: tagging one or more words in the one or more phrases as at least one of a sentiment based word, an emotional word, an emphasized word, and an accent to be used when recording the word; and, including in the instructions, directions to read each tagged word according to the tagging.

The database can comprise one or more tags associated with one or more words in the statements, each of the one or more tags comprising a linguistic rule to apply to the one or more words.

The method can further comprise: determining that at least a portion of the one or more statements in the database correspond to one or more of existing recorded phrases in a recording database, the automatically assembling comprising automatically assembling, via the processor, only the one or more of the statements from the database that do not correspond to the one or more of the existing recorded phrases into the one or more phrases to be recorded, along with associated linguistic rules. The recording database can comprise a voice library.

The method can further comprise: transmitting, via the communication interface, the recording plan to a terminal associated with a recording talent; receiving, via the communication interface, recorded phrases corresponding to the one or more phrases in the recording plan from the terminal; and, storing the recorded phrases in a recording database.

The recording talent can comprise one or more of a human recording talent and an automated recording talent. The method can further comprise: assembling the recorded phrases in the recording database into one or more data driven dialogs, each of the data driven dialogs comprising a recording for the automated communication. The method can further comprise: processing records, comprising one or more of network addresses, name records and customer records; and, assembling the recorded phrases in the recording database into one or more data driven dialogs in a one-to-one relationship with the records, each of the data driven dialogs comprising a recording for the automated communication customized for each record. Customization of the one or more data driven dialogs for each of the records can comprise one or more of: including a name stored in a respective record in each of the one or more data driven dialogs; and, selecting a respective recorded phrase from the recording database for each of the one or more data driven dialogs based on one or more fields associated with the respective record. The one or more fields can comprise at least one of: a network address, a geographic address, a respective geographic address associated with a customer associated with the name, account numbers associated with the customer, a phone number associated with the customer, a "value" associated with the customer, a length of time that the customer has been engaged with an entity associated with the records, a first date of interactions between the customer and the entity, a most recent date of interactions between the customer and the entity, and a number of interactions between the customer and the entity, and an expiry date of a product purchased by the customer from the entity.

Another aspect of the specification provides a device for assembling a recording plan for an automated communication comprising: a memory, a communication interface and a processor, the memory storing a database of statements comprising one or more of first names, last names, greeting statements, sentiment statements, influence statements, call to action statements, and legal statements, the processor configured to: automatically assemble one or more statements from the database into one or more phrases to be recorded; associate instructions for applying linguistic rules with the one or more phrases, including where to insert pauses in the one or more phrases; and, store, at the memory, the recording plan comprising the one or more phrases in association with the instructions.

The processor can be further configured to: tag one or more words in the one or more phrases as at least one of a sentiment based word, an emotional word, an emphasized word, and an accent to be used when recording the word; and, include in the instructions, directions to read each tagged word according to the tag.

The database can comprise one or more tags associated with one or more words in the statements, each of the one or more tags comprising a linguistic rule to apply to the one or more words.

The processor can be further configured to: determine that at least a portion of the one or more statements in the database correspond to one or more of existing recorded phrases in a recording database, and the processor can be further configured to automatically assemble the one or more of statements from the database into one or more phrases to be recorded by automatically assembling only the one or more of the statements from the database that do not correspond to the one or more of the existing recorded phrases into the one or more phrases to be recorded, along with associated linguistic rules. The recording database can comprise a voice library.

The processor can be further configured to: transmit, via the communication interface, the recording plan to a terminal associated with a recording talent; receive, via the communication interface, recorded phrases corresponding to the one or more phrases in the recording plan from the terminal; and, store the recorded phrases in a recording database. The recording talent can comprise one or more of a human recording talent and an automated recording talent. The processor can be further configured to: assemble the recorded phrases in the recording database into one or more data driven dialogs, each of the data driven dialogs comprising a recording for the automated communication. The processor can be further configured to: process records, comprising one or more of network addresses, name records and customer records; and, assemble the recorded phrases in the recording database into one or more data driven dialogs in a one-to-one relationship with the records, each of the data driven dialogs comprising a recording for the automated communication customized for each record. Customization of the one or more data driven dialogs for each of the records can comprise one or more of: including a name stored in a respective record in each of the one or more data driven dialogs; and, selecting a respective recorded phrase from the recording database for each of the one or more data driven dialogs based on one or more fields associated with the respective record. The one or more fields can comprise at least one of: a network address, a geographic address, a respective geographic address associated with a customer associated with the name, account numbers associated with the customer, a phone number associated with the customer, a "value" associated with the customer, a length of time that the customer has been engaged with an entity associated with the records, a first date of interactions between the customer and the entity, a most recent date of interactions between the customer and the entity, and a number of interactions between the customer and the entity, and an expiry date of a product purchased by the customer from the entity.

Another aspect of the specification provides a computer program product, comprising a computer usable medium having a computer readable program code adapted to be executed to implement a method of assembling a recording plan for an automated communication comprising: at a computing device comprising a memory, a communication interface and a processor, the memory storing a database of statements comprising one or more of first names, last names, greeting statements, sentiment statements, influence statements, call to action statements, and legal statements: automatically assembling, via the processor, one or more statements from the database into one or more phrases to be recorded; associating, via the processor, instructions for applying linguistic rules with the one or more phrases, including where to insert pauses in the one or more phrases; and, storing, at the memory, the recording plan comprising the one or more phrases in association with the instructions. The computer usable medium can comprise a non-transitory computer usable medium.

Another aspect of the specification provides a method comprising: at a computing device comprising a processor, a memory, and a communication interface, determining, at the processor, at least a start time of playing of a recording, comprising audio of one or more of phrases and words, in an automated communication; receiving, via the communication interface, time-stamped data associated with events related to the playing of the recording in the automated communication; correlating, via the processor, the time-stamped data with one or more of phrases and words in the recording based on the start time; and, storing, in the memory, correlation data indicative of correlations between the time-stamped data with one or more of the phrases and the words in the recording.

The recording can comprise one or more of: an audio recording, an interactive voice call recording, a video recording, streaming data, avatar data, and browser data; and the automated communication can comprise one or more of: an interactive voice call, a video call, and a communication in a browser environment.

The time-stamped data can comprise one or more of: hang-ups in an interactive voice call, receipt of data at a website associated with the automated communication, a call to a call centre associated with the automated communication.

The method can further comprise producing a graph of correlations between the time-stamped data and the one or more phrases.

The method can further comprise producing a graph of a number of time-stamped data events as a function of time.

Yet a further aspect of the specification provides a device comprising: a processor, a memory, and a communication interface, the processor configured to: determine at least a start time of playing of a recording, comprising audio of one or more of phrases and words, in an automated communication; receive, via the communication interface, time-stamped data associated with events related to the playing of the recording in the automated communication; correlate the time-stamped data with one or more of phrases and words in the recording based on the start time; and, store, in the memory, correlation data indicative of correlations between the time-stamped data with one or more of the phrases and the words in the recording.

The recording can comprise one or more of: an audio recording, an interactive voice call recording, a video recording, streaming data, avatar data, and browser data; and the automated communication can comprise one or more of an interactive voice call, a video call, and a communication in a browser environment.

The time-stamped data can comprise one or more of: hang-ups in an interactive voice call, receipt of data at a website associated with the automated communication, a call to a call centre associated with the automated communication.

The processor can be further configured to produce a graph of correlations between the time-stamped data and the one or more phrases.

The processor can be further configured to produce a graph of a number of time-stamped data events as a function of time.

Another aspect of the specification provides a computer program product, comprising a computer usable medium having a computer readable program code adapted to be executed to implement a method comprising: at a computing device comprising a processor, a memory, and a communication interface, determining, at the processor, at least a start time of playing of a recording, comprising audio of one or more of phrases and words, in an automated communication; receiving, via the communication interface, time-stamped data associated with events related to the playing of the recording in the automated communication; correlating, via the processor, the time-stamped data with one or more of phrases and words in the recording based on the start time; and, storing, in the memory, correlation data indicative of correlations between the time-stamped data with one or more of the phrases and the words in the recording. The computer usable medium can comprise a non-transitory computer usable medium.

DETAILED DESCRIPTION

FIG. 1 depicts a device 101 for assembling a recording plan and data driven dialogs for automated communications, according to non-limiting implementations. Device 101 comprises: a processor 120, a memory 122, and a communication interface 124, and optionally: a display 126, an input device 128, a speaker 132, and a microphone 134. Communication interface 124 will be interchangeably referred to hereafter as interface 124. Memory 122 stores a database 140 of statements 142 comprising one or more of first names, last names, greeting statements, sentiment statements, influence statements, call to action statements, legal statements, and supplementary data, as described in further detail below. In some implementations, and as depicted, memory 122 can further store linguistic rules 144 comprising one or more of rules for applying natural speech pronunciation to statements 142 and/or applied to phrases in recordings, and/or used to generate instructions for applying one or more linguistic rules to phrases to be recorded, as described in more detail below. In particular, the linguistic rules 144 can include a rule and/or instructions on where to insert pauses in phrases in recordings and/or in phrases to be recorded.

As described in more detail below, memory 122 can also store a recording database 146 storing existing recorded phrases 148 (e.g. recorded phrases previously populated at recording database 146); in general, recorded phrases 148 correspond to recordings of statements 142 stored at database 140. As described in further detail below, recorded phrases 148 can be used to generate data driven dialogs. Each data driven dialog can include, but is not limited to, an audio recording, an interactive voice call recording, a video recording, streaming data, avatar data, browser data, and the like.

Further, while database 140 and recording database 146 are depicted as separate databases, in other implementations, databases 140, 146 can be combined in a single database.

Processor 120 is generally configured to: automatically assemble one or more statements 142 from database 140 into one or more phrases to be recorded; associate instructions for applying linguistic rules, including but not limited to linguistic rules 144 stored at database 140, with the one or more phrases, including where to insert pauses in the one or more phrases; and, store, at the memory, a recording plan comprising the one or more phrases in association with the instructions.

Device 101 can include, but is not limited to, any suitable combination of electronic devices, communications devices, computing devices, personal computers, servers, laptop computers, portable electronic devices, mobile computing devices, portable computing devices, tablet computing devices, laptop computing devices, internet-enabled appliances and the like. Other suitable devices are within the scope of present implementations.

In implementations where device 101 comprises a server, device 101 can be based on any well-known server environment including a module that houses one or more central processing units, volatile memory (e.g. random access memory), persistent memory (e.g. hard disk devices) and network interfaces to allow device 101 to communicate over a link to communication network 303. For example, device 101 can be a Sun Fire V480 running a UNIX operating system, from Sun Microsystems, Inc. of Palo Alto Calif., and having four central processing units each operating at about nine-hundred megahertz and having about sixteen gigabytes of random access memory. However, it is to be emphasized that this particular server is merely exemplary, and a vast array of other types of computing environments for device 101 are contemplated. It is further more appreciated that device 101 can comprise any suitable number of servers that can perform different functionality of server implementations described herein.

Further, when device 101 comprises a server, device 101 need not comprise optional display 126, input device 128, speaker 132, and/or microphone 134, but rather interactions with device 101 occur via communications with an external device using a suitable connection and/or link and/or interface 124 and optionally a communications network.

Otherwise device 101 can comprise at least one input device 128 generally configured to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from interface 124, and/or input device 128, is received at processor 120 (which can be implemented as a plurality of processors, including but not limited to one or more central processors (CPUs)). Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art will now recognize that memory 122 is an example of computer readable media that can store programming instructions executable on processor 120. Furthermore, memory 122 is also an example of a memory unit and/or memory module.

Memory 122 further stores an application 155 that, when processed by processor 120, enables processor 120 to: automatically assemble one or more statements 142 from database 140 into one or more phrases to be recorded; associate instructions for applying linguistic rules, including by not limited to linguistic rules 144 stored at database 140, with the one or more phrases, including where to insert pauses in the one or more phrases; and, store, at the memory, a recording plan comprising the one or more phrases in association with the instructions. Application 155 can further include instructions for assembling data driven dialogs and/or for correlating time-stamped data with recordings, as described in further detail below.

Furthermore, memory 122 storing application 155 is an example of a computer program product, comprising a non-transitory computer usable medium having a computer readable program code adapted to be executed to implement a method, for example a method stored in application 155.

Processor 120 can be further configured to communicate with optional display 126, microphone 134 and/or speaker 132. Display 126 comprises any suitable one of, or combination of, flat panel displays (e.g. LCD (liquid crystal display), plasma displays, OLED (organic light emitting diode) displays, capacitive or resistive touchscreens, CRTs (cathode ray tubes) and the like). Microphone 134 comprises any suitable microphone for receiving sound and converting to audio data. Speaker 132 comprises any suitable speaker for converting audio data to sound to provide one or more of audible alerts, audible communications from remote communication devices, and the like. In some implementations, display 126, input device 128, speaker 132 and/or microphone 134 can be external to device 101, with processor 120 in communication with each of input device 128 and display 126 via a suitable connection and/or link.

Figure 4:
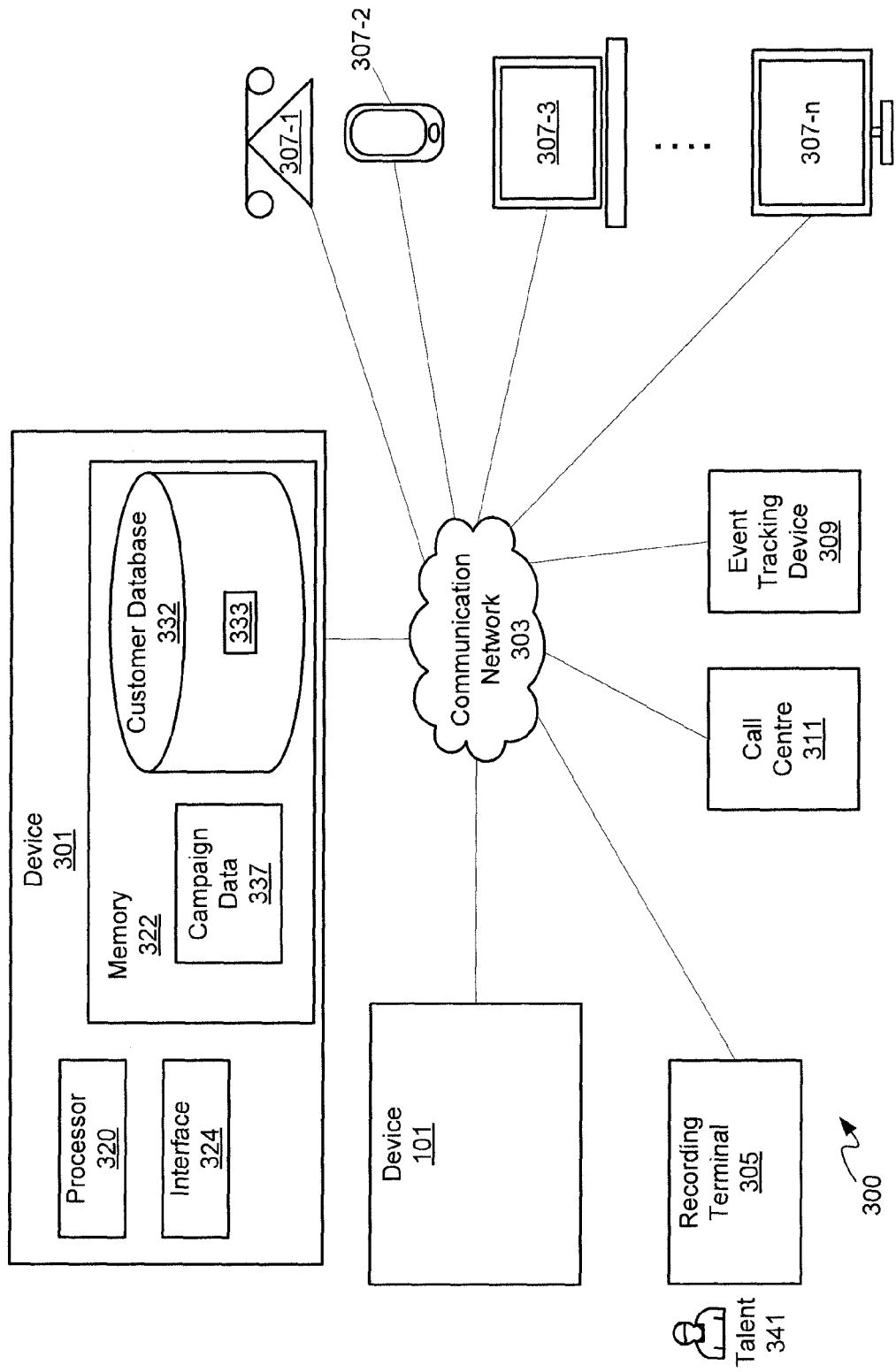
FIG. 4 depicts a system for assembling a recording plan and data driven dialogs for automated communications and deploying the data driven dialogs, according to non-limiting implementations.

Processor 120 also connects to communication interface 124 (interchangeably referred to interchangeably as interface 124), which can be implemented as one or more radios and/or connectors and/or network adaptors and/or transceivers, configured to wirelessly communicate with one or more communication networks (see FIG. 4). It will be appreciated that interface 124 is configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like), wireless data, Bluetooth links, NFC (near field communication) links, WLAN (wireless local area network) links, WiFi links, WiMax links, packet based links, the Internet, analog networks, the PSTN (public switched telephone network), access points, and the like, and/or a combination.

While not depicted, device 101 further comprises a power source, for example a connection to a mains power supply and a power adaptor (e.g. and AC-to-DC (alternating current to direct current) adaptor, and the like).

In any event, it should be understood that a wide variety of configurations for device 101 are contemplated.

Figure 2:
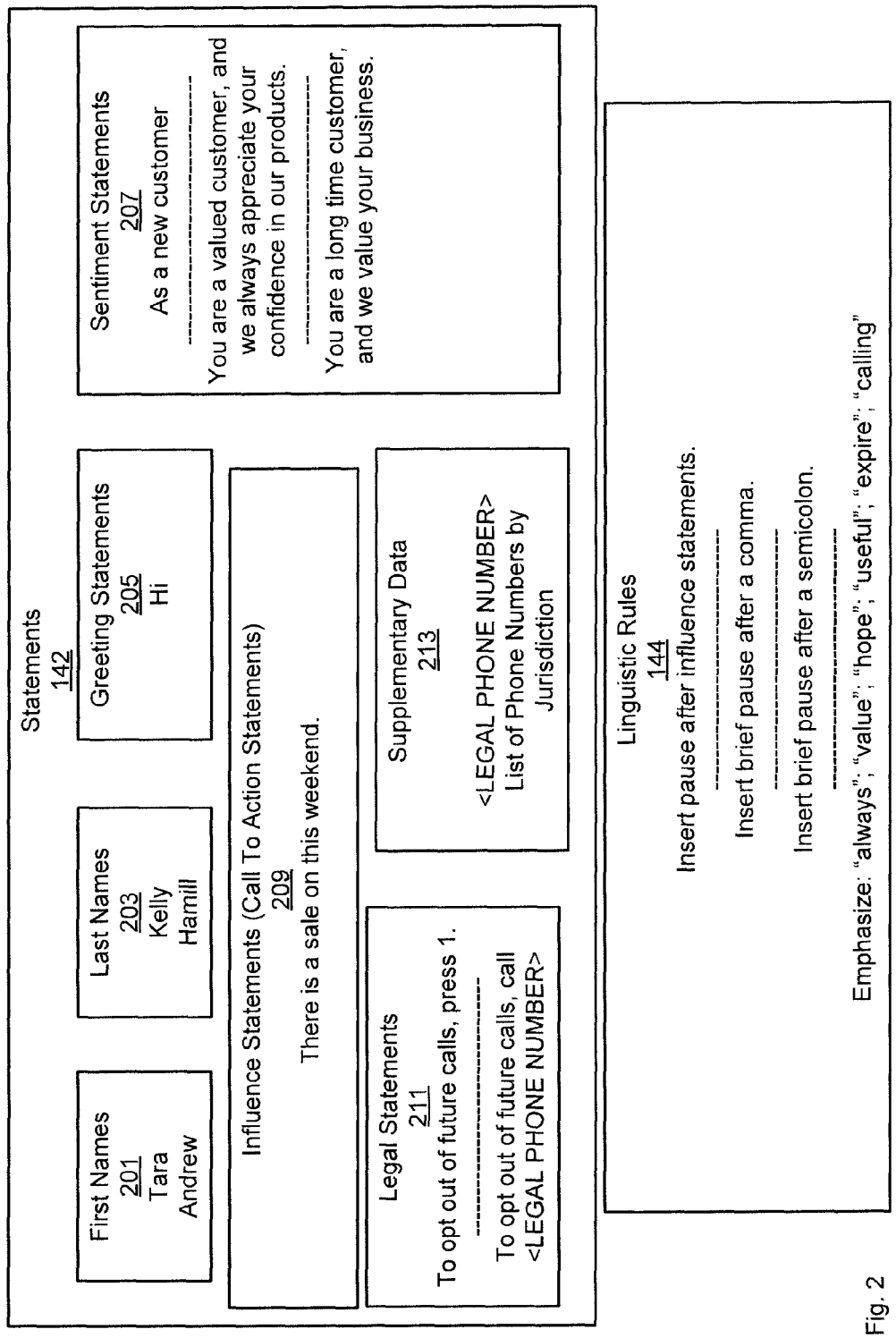

Attention is now directed to FIG. 2 which depicts non-limiting implementations of statements 142 stored at database 140. While statements 142 are presented as grouped statement categories, as described hereafter, it is understood that statements 142 can be stored in any suitable format and need not be arranged as depicted; for example, statements 142 can be stored in a database format.

Statements 142 include, but are not limited to: first names 201, last names 203, greeting statements 205, sentiment statements 207, influence statements and/or call to action statements 209 (interchangeably referred to hereafter as influence statements 209), legal statements 211, and optional supplementary data 213. As depicted, database 140 stores two names under first names 201, two names under last names 203, and one statement each under each of greeting statements 205, influence statements 209, two statements under legal statements 211, and three statements under sentiment statements 207. Further, the second legal statement can comprise a field <LEGAL PHONE NUMBER> into which a phone number can be inserted when an associated recording of the legal statement is being generated; indeed, throughout this specification, fields where data can be inserted are depicted with a structure of <FIELD>, though other formats are within the scope of present implementations. However, it is appreciated that the second legal statement is merely example and is not to be considered unduly limiting; for example, some implementations can include legal statements with a legal phone number field, while others do not.

Statements 142 can further comprise supplementary data 213 which can include, but is not limited to, a list of phone numbers for populating the <LEGAL PHONE NUMBER> field, the list of phone numbers comprising phone numbers to call to opt out of receiving automated voice messages, indexed by jurisdiction and/or geographic location. While not depicted, database 140 can optionally further store data on which jurisdictions ask that legal statements to be added to automated messaging system calls.

Further population of statements 142 will be described below with respect to FIGS. 8-11.

FIG. 2 further depicts a non-limiting example linguistic rules 144; as depicted linguistic rules 144 comprise four rules, though in other implementations linguistic rules 144 can comprise fewer than four rules or more than four rules; linguistic rules 144 can be added, deleted and/or modified by an administrator of device 101 and/or by using heuristic learning and/or automated heuristic learning at device 101. Further, at least one linguistic rule 144 comprises a rule on where to insert pauses in one or more phrases to be used in data driven dialogs, for example, after influence statements, after commas, after semicolons and the like.

However, other linguistic rules 144 can comprise a list of words to emphasize in one or more phrases to be recorded for generation of data driven dialogs, for example the words "always", "value", "hope", "useful", "expire" and "calling". In other words, certain words can be tagged as at least one of a sentiment based word, an emotional word, and/or an emphasized word. In further implementations, linguistic rules 144 can include further instructions on how to record words in one or more phrases to be recorded, for example, sentimentally, emotionally, and the like.

Other linguistic rules are within the scope of present implementations, including, but not limited to, grammatical rules, rules associated with dialects, rules associated with regional grammar, slang, and/or pronunciation, rules associated with specific languages and the like. With regards to specific languages, while present implementations are described with respect to English, in other implementations statements 142, and associated linguistic rules 144, can be provided in any language. Further, while linguistic rules 144 are depicted as instruction statements (for example to be included in a recording plan), in other implementations, linguistic rules 144 can be provided according to any suitable linguistic rule notations, and/or as software code, for example for interpretation by an automated recording talent, as described below.

Attention is next directed to FIG. 3, which depicts a non-limiting example of recorded phrases 148 stored at recording database 146. While recorded phrases 148 are depicted as stored in rows, it is understood that recorded phrases 148 can be stored in any suitable format and need not be arranged as depicted; for example, recorded phrases 148 can be stored in a database format. Specifically, recorded phrases 148 comprises audio recordings to be used in data driven dialogs; as depicted, recorded phrases 148 have been pre-populated with audio recordings of statements 142 stored at database 140, with each line in recorded phrases 148 corresponding to a statement 142, as well as other words that can be used in data driven dialogs, such as "In" and "Your". While recorded phrases 148 in FIG. 3 are depicted as text, it is appreciated that they are stored as audio files, indexed according to corresponding text.

Furthermore, while not depicted, each version of recorded phrases 148 can exist more than once in recording database 146, for example recorded according to regional accents, and/or recorded by more than one recording talent (e.g. a male recording talent and/or a female recording talent).

Further, while not depicted, in some implementations, each recorded phrase 148 in recording database 146 can be categorized as one or more of a first name recording, a last name recording, a greeting statement recording, a sentiment statement recording, an influence statement recording, a call to action statement recording, a legal statement recording, and a supplemental data recording.

While not depicted, recorded phrases 148 can include common words, numbers, dates, months, days of weeks, years, and the like, and indexed accordingly.

Attention is next directed to FIG. 4, which depicts a system 300 comprising: device 101, and a client device 301 in communication via a communication network 303, interchangeably referred to hereafter as network 303. Client device 301 will be interchangeably referred to hereafter as device 301. System 300 further comprises a recording terminal 305, end channels terminals 307-1, 307-2, 307-3 . . . **307-*n*, and optionally at least one event tracking device 309, and a call centre 311. End channels 307-1, 307-2, 307-3 . . . 307-*n* will be interchangeably referred to hereafter, collectively, as end channels 307, and generically as an end channel 307**.

In general, system 300 can be used to generate and deliver data driven dialogs to end channels 307. Each data driven dialog comprising a recording customized for a given end channel 307, each data driven dialog automatically generated using recorded phrases 148 in a one-to-one relationship with end channels 307 therewith and/or in a one-to-one relationship with customers of an entity associated with device 301. The data driven dialogs can then be delivered to end channels 307 using network 303.

Device 301 can be substantially similar to device 101; for example device 301 can also comprise a respective processor 320 interconnected with a memory 322 and a communication interface 324 (also referred to interchangeably as interface 324), each respectively similar to processor 120, memory 122, and interface 124. While not depicted, device 301 can further comprise an input device, a display, a speaker and/or a microphone, similar to device 101. In some implementations device 301 comprises a server similar to that described above with reference to device 101.

While only one device 301 is depicted, any number of devices 301 is within the scope of present implementations, including, but not limited to, tens, hundreds and thousands of devices 301. For example, an entity associated with device 101 can provide a service for an entity associated with device 301 (e.g. the entity associated with device 301 can be a client of the entity associated with device 101, and the entity associated with device 101 can have tens and/or hundreds and/or thousands of clients, and/or more clients, etc.).

Device 301 further stores, at memory 322, a customer database 332 comprising customer records 333, which can comprise one more of name records and customer records, associated with fields, as described in further detail below with respect to FIG. 5.

While implementations described herein colloquially refer to "clients" and "customers", such terms are meant to be illustrative only. For example, devices 101, 301 and/or end points 307 can be operated by the same entity; furthermore, each end point 307 need not be associated with a "customer", for example a human being. Rather, in some implementations, one or more end points 307 can comprise computing device and/or a terminal and/or a data terminal and/or a kiosk where data driven dialogs are delivered, for example in a public space; that is, an end point 307 can be operated by an entity and not associated with any given person and/or customer.

Memory 322 can further store campaign data 337 comprising one more of greeting statements, sentiment statements, influence statements, call to action statements, legal statements, and supplementary data, similar to that described above with respect to FIG. 2, and described in further detail below with respect to FIGS. 6 and 7; however, initially at system 300, device 301 can store a larger and/or different set of statements at campaign data 337 as compared to statements 142 at device 101.

In general, campaign data 337 comprises data associated with an automated voice messaging campaign (referred to hereafter as a "campaign") that the entity associated with device 301 desires to implement by contacting customers at end channels 307, for example to advertise a service, collect bills and/or overdue accounts, and the like. As such the entity associated device 301 can engage the entity associated with device 101 to implement the campaign, and/or generate data driven dialogs for the campaign, with the entity associated with device 301 supplying customer records 333 and campaign data 337 to implement the campaign.

Attention is next directed to FIG. 5 which depicts a non-limiting example of customer records 433; in other words, customer records 333 can comprise customer records 333, with one customer record per row. While customer records 433 are presented in rows and columns, it is understood that customer records 433 can be stored in any suitable format and need not be arranged in rows and columns; for example, customer records 433 can be stored in a database format. Customer records 433 generally comprise: first names and last names of customers of the entity associated with device 301, stored in electronic form, for example "Tara Kelly", "Andrew Hamill", "Ken Hackl", etc.

Fields associated with customers referenced in customer records 433 can include, but are not limited to: network addresses, geographic addresses, a respective geographic address associated with each customer, account numbers associated with each customer, a phone number associated with each customer, a "value" associated with each customer, a length of time that the customer has been engaged with the entity associated with device 301 and/or (as depicted) a first date of interactions between each customer and the entity associated with device 301, a most recent and/or "last" date of interactions between each customer and the entity associated with device 301, and a number of interactions ("# Interactions") between each customer and the entity associated with device 301, and the like. In some non-limiting implementations, as depicted, each of customer records 433 can include an expiry date of a product (for example a software product) purchased by an associated customer from the entity associated with device 301.

Rather than, and/or in addition to, a phone number, each customer record can include one or more of associated internet protocol address, an associated MAC (media access control) address, and the like, to identify equipment and/or devices and/or end channels 307 associated with a given customer. Network addresses and/or geographic addresses can further include network addresses and/or geographic addresses, and the like, of computing devices, kiosks etc., that are not specifically associated with a given customer. Customer records 333, 433 can further include, but are not limited to, accent information (e.g. an accent associated with one or more customers), regional and/or geographical and/or location data, language preferences, profile data (e.g. customer profile data), and preference data (e.g. customer preference data).

Each "interaction" between a customer and the entity associated with device 301 can include, but is not limited to, a visit by a customer to a physical or web-based store and/or a geographic location associated with the entity associated with device 301, a visit by a customer to a web site associated with the entity associated with device 301, purchasing goods and/or services and/or products from the entity associated with device 301, borrowing money from the entity associated with device 301, receipt of mail, payments etc. sent by a customer to the entity associated with device 301, and the like.

Indeed, an "interaction" can be defined by each entity according to any definition of an "interaction" that the entity wishes to apply. Further, an interaction between customers of the entity associated with device 301 can be tracked using loyalty cards, credit cards, security cameras, purchasing histories, browser cookies, and the like.

A new customer record 433 can be added whenever the entity associated with device 301 gains a new customer, and the associated fields can be populated as data is collected about the customer; further the associated fields can be updated as events and/or interactions associated with the customer occur, for example as the customer interacts with and/or engages the entity associated with device 301.

While only five records are depicted in customer records 433, any number of records is within the scope of present implementations, including, but not limited to, hundreds to thousands to millions of records. For example, an entity associated with device 301 can have thousands to millions of customers, with one record for each customer.

Further, each customer stored in customer records 433 can be categorized according to one of a number of value-based categories, as depicted "New", "Valued", and "Long-time", though in other implementations, more than three and fewer than three value based categories can be used. Further, each value-based category can be based on a given formula, which can be defined by the entity associated with device 301. For example: a "New" customer can be a customer whose first documented interaction with the entity associated with device 301 is within a year of a current date: a "Valued" customer can be a customer whose first documented interaction with the entity associated with device 301 is outside of a year of a current date and/or that has more than 10 interactions with the entity associated with device 301; and a "Long-time" customer can be a customer whose first documented interaction with the entity associated with device 301 is outside of a year of a current date, and that has fewer than 10 interactions with can be a customer whose first documented interaction with the entity associated with device 301 is outside of a month of a current date and that has more than 10 interactions with the entity associated with device 301.

Further, while each category, as depicted, is depicted as alpha-numeric using recognized words, in other implementations, each category can be numerically based (e.g. "1", "2", "3" for, respectively, "New", "Valued", and "Long-time"), and/or alpha-numeric categories which are not based on recognized words (e.g. "N1", "V2", "L3", for, respectively, "New", "Valued", and "Long-time").

Furthermore, while customer records 433, as depicted, refer to specific human beings, customer records 433 need not comprise records of human beings that are specifically customers of an entity associated with device 301; rather, customer records 433 store information associated with anyone and/or any end point 307 to which a data driven dialog is to be delivered, as described below.

Attention is next directed to FIG. 6 which depicts a non-limiting example of campaign data 537; in other words, campaign data 337 can comprise campaign data 537. In the depicted example, campaign data 537 is for a campaign to inform customers associated with end-channels 307 of expiry dates of a software product (i.e. called "AlphaPro"). While campaign data 537 is presented as grouped statement categories, as described hereafter, it is understood that campaign data 537 can be stored in any suitable format and need not be arranged as depicted; for example, campaign data 537 can be stored in a database format.

Campaign data 537 generally comprise: greeting statements 505, sentiment statements 507, influence/call to action statements 509 (interchangeably referred to hereafter as influence statements 509), and supplementary data 513.

As will become apparent, supplementary data 513 comprises data that can be used to populate fields of greeting statements 505, sentiment statements 507, action statements 509 and/or legal statements 211 for a particular campaign, for example a campaign associated with campaign data 537. While only one greeting statement 505 is depicted, in other implementations, more than one greeting statement 505 can be included, a given greeting statement 505 chosen for a data driven dialog based on data in customer records 333, 433, for example, depending on whether a customer is categorized as "New", "Valued" or "Long-time".

In general, greeting statements 505 comprise statements that can be used as a greeting at the beginning of a data driven dialog for a given customer as stored in customer records 333, 433. As depicted greeting statements 505 comprise a single greeting statement that comprises fields (indicted by "< >"), which can be populated by data stored in customer records 333, 433 and/or supplementary data 513; for example, a field <FIRST NAME> can be populated using first names stored in customer records 333, 433, and fields <ENTITY NAME>, <ENTITY LOCATION>, and <PRODUCT NAME> can be populated with supplementary data 513. For example, supplementary data 513 stores <ENTITY NAME> as "National Software", <ENTITY LOCATION> as "Detroit", and <PRODUCT NAME> as "AlphaPro".

Sentiment statements 507 can comprise statements that can be used to establish a relationship with a customer in a data driven dialog; further each sentiment statement 507 can be associated with a value field stored in customer records 333, 433, for example "New", "Valued", "Long-time", so that a given sentiment statement 507 can be chosen for a given data driven dialog customized for an associated customer. As depicted, one or more sentiment statements 507 can comprise a field, such as <PRODUCT NAME> which can be populated using data stored at supplementary data 513; in other implementations, sentiment statements 507 can comprise fields that can be populated from customer records 333, 433.

Influence statements 509 can comprise statements that can be used to influence a behavior of a customer during a data driven dialog and/or be used as a call to action to a customer during a data driven dialog. While only one influence statement 509 is depicted, in other implementations, more than one influence statement 509 can be included, a given influence statement 509 chosen for a data driven dialog based on data in customer records 333, 433, for example, depending on whether a customer is categorized as "New", "Valued" or "Long-time".

As depicted, one or more influence statements 509 can comprise a field, such as <PRODUCT NAME> which can be populated in a data driven dialog using data stored at supplementary data 513. Further, as depicted, one or more influence statements 509 comprise a field <EXPIRY DATE> which can be populated in a data driven dialog using data stored at customer records 333, 433, for example expiry dates from FIG. 5. As depicted, one or more influence statements 509 can comprise a field, such as <TIME PERIOD> which can be populated in a data driven dialog using data received from call centre 311; in other words, the depicted influence statement 509 comprises instructions to extend a software license by pressing "1" on a keypad (e.g. a keypad of an end channel) to be connected to call centre 311, the instructions including a field <TIME PERIOD> which comprises an estimated time within which a customer listening to a data driven dialog will be called back from call centre 311 by a customer service representative ("CSR"). Hence, in these implementations the field <TIME PERIOD> can be received from call centre 311. In some implementations, the data driven dialogs can be delivered to end channels 307 from call centre 311 and a processor at call centre 311 can populate the field <TIME PERIOD> based on current wait times for a CSR; in implementations where the data driven dialogs are delivered to end channels 307 from a device other than call centre 311 (for example device 101 and/or device 301), the device can query call centre 311 via network 303 and receive a current wait time from call centre 311, which can be used to populate field <TIME PERIOD>, as described below with reference to FIG. 20.

While not depicted, campaign data 537 can further comprise an indication of a given recording talent to be used in the associated campaign: for example, a given male voice, a female voice, and/or a given style of speaking (natural, theatrical, and the like) and/or one more regional accents.

Attention is next directed to FIG. 7 which depicts an alternative non-limiting example of campaign data 637; in other words, campaign data 337 can comprise campaign data 637. In the depicted example, campaign data 637 is for a campaign to inform customers associated with end-channels 307 of events occurring at stores associated with the entity associated with device 301. As with campaign data 537, campaign data 637 is presented as grouped statement categories, with phrases in each statement category, however it is understood that campaign data 637 can be stored in any suitable format and need not be arranged as depicted; for example, campaign data 637 can be stored in a database format. Campaign data 637 generally comprise: greeting statements 605, sentiment statements 607, influence/call to action statements 609 (interchangeably referred to hereafter as influence statements 609), and supplementary data 613.

Similar to supplementary data 513, supplementary data 613 comprises data that can be used to populate fields of greeting statements 605, sentiment statements 607, action statements 609 and/or legal statements 211 for a particular campaign; however, in contrast to supplementary data 513, supplementary data 613 comprises lists of data that are indexed by location, for example store locations; such data can include (as depicted), but is not limited to a list of store locations, a list of store manager names indexed by store location, a list of <DAYS> and/or <DATES> of events indexed by store location, and the like. Hence, for a data driven dialog for a given customer in customer records 333, 433, data can be customized according to an address of a given customer. For example, in greeting statements 605 and influence statements 609, a store manager name, a store location, and a day and/or date of an event name can be customized in a data driven dialog according to a closest store location to the address of a given customer.

As depicted, supplementary data 613 comprises further data (specifically <GIFT NAME>) indexed by the value categories of FIG. 5, so that associated <GIFT NAME> fields in sentiment statements 607 can be populated in a data driven dialog according the value category of a customer.

Otherwise, campaign data 637 is similar to campaign data 537 with a <STORE NAME>, <EVENT NAME> and <GIFT NAME> customized in a data driven dialog in each of greeting statements 605, sentiment statements 607, influence statements 609 and according to data in supplementary data 613.

Returning to FIG. 4, recording terminal 305, interchangeably referred to hereafter as a terminal 305, can comprise a device similar to device 101. Terminal 305 can be associated with a recording talent. The recording talent can, in some implementations comprise a human recording talent 341, for example a human that can record phrases in a recording plan; in these implementations, terminal 305 can comprise a speaker and microphone. In other implementations, the recording talent can comprise an automated recording talent, for example a combination of software and hardware elements which can generate audio files corresponding to phrases in a recording plan.

Each recording talent can be associated with a given campaign, a given regional accent, a given style, and the like. For example, a given recording talent can provide recording of words and/or phrases in certain regional accents and/or have been used before in another campaign by the entity associated with device 301; hence, the entity associated with device 301 can specify, for example, in campaign data 337, which recording talent to use and/or which terminal 305 to use, for consistency between campaigns.

While only one terminal 305 is depicted, any number of terminals 305 is within the scope of present implementations, including, but not limited to, tens, hundreds and thousands of terminals 305. For example, as terminal 305 is associated with a recording talent, such as human recording talent 341, system 300 can comprise a plurality of terminals 305, each associated with a different human recording talent 341, and hence a different voice for recording phrases in a recording plan. In some implementations, the plurality of terminals 305 can be co-located, for example at a location associated with an entity that provides recording talent for automated communications. In other implementations, terminals 305 can be located at different locations. Furthermore assigning of a terminal 305 and/or a recording talent to a campaign can occur manually and/or using campaign data 337 and/or using rules; for example, when customer records 433 comprise addresses for a given geographic region, a terminal 305 and/or an associated recording talent can be automatically selected based on a terminal and/or an associated recording talented being associated with an accent for the given geographic region. Such rules can be stored and/or applied at device 301 and/or at device 101.

In some implementations, device 101 and terminal 305 can be combined into one device, for example, when the recording talent comprises an automated recording talent.

Each end channel 307 can comprise one or more of a telephone, a land-line telephone, a cell phone, a mobile phone, a portable phone, a mobile communication device, a portable communication device, a web device, a computer, a browser based device, a kiosk, signage, in-store signage and the like. In general, each end channel 307 comprises a device which can receive a call and/or a message, that can include a recording and/or a data driven dialog, and the like in an automated messaging system, an IVR system, and the like, as described in further detail below. Each recording and/or data driven dialog can include, but is not limited to, an audio recording, an interactive voice call recording, a video recording, streaming data, avatar data, and browser data; hence each end channel 307 can include a device which can receive and/or interact with one or more of: an audio recording, an interactive voice call recording, a video recording, streaming data, avatar data, and browser data.

Further, while "n" end channels 307 are depicted, any number of end channels 307 are within the scope of present implementations, including, but not limited to, thousands and/or millions of end channels 307. For example, each end channel 307 can correspond to a customer of the entity associated with device 301, and/or customers specified in customer records 333.

Event tracking device 309 can comprise a device configured to generate time-stamped data associated with events related to the playing of a recording in an automated communication, which can include, but is not limited to, an interactive voice call, a video call, a voice call, and a communication in a browser environment, as described in further detail below. Hence, event tracking device 309 can comprise one or more of an end channel 307, device 301, call centre 311, a web-server, and the like.

Call centre 311 comprises one or more devices for conducting calls over communication network 303, for example a plurality of telephone terminals which can be operated by CSRs. Call centre 311 can further comprise one or more devices for tracking call centre data, including, but not limited to, a time until a next CSR is available, and the like, which can be used to populate fields in campaign data 337, 537, 637 and/or data driven dialogs.

Each device 101, device 301, terminal 305, end channels 307, event tracking device 309, and call centre 311 are in communication with network 303 via one or more respective of links, each of which can include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), access points, and the like, and/or a combination. Each device 101, device 301, terminal 305, end channels 307, and event tracking device 309 can hence include one or more communication interfaces (e.g. interfaces 124, 324) for communicating over respective links.

Figure 8:
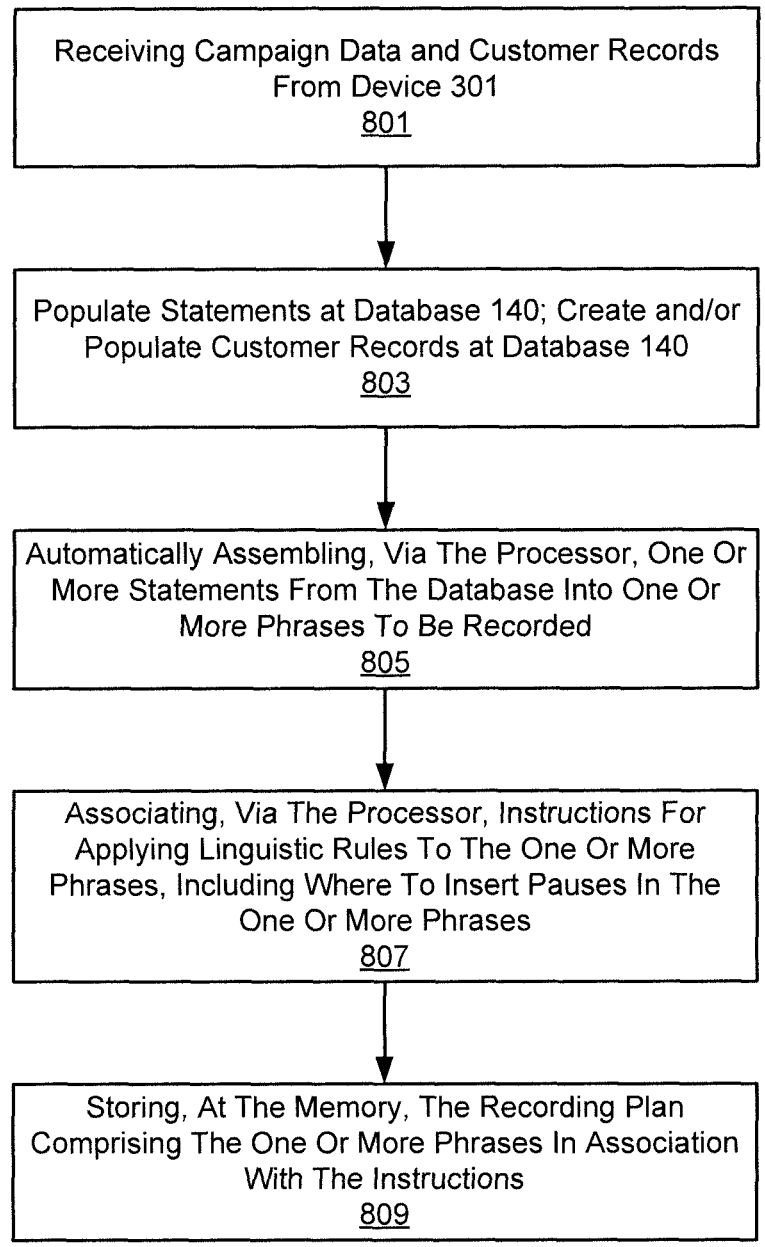
FIG. 8 depicts a flowchart of a block diagram of a method for assembling a recording plan, according to non-limiting implementations.

Attention is now directed to FIG. 8 which depicts a flowchart illustrating a method 800 of assembling a recording plan for an automated communication, according to non-limiting implementations. In order to assist in the explanation of method 800, it will be assumed that method 800 is performed using device 101. Furthermore, the following discussion of method 800 will lead to a further understanding of device 101 and its various components. However, it is to be understood that device 101 and/or method 800 can be varied, and need not work exactly as discussed herein in conjunction with each other, and that such variations are within the scope of present implementations. It is appreciated that, in some implementations, method 800 is implemented in device 101 by processor 120, for example by implementing application 155.

It is to be emphasized, however, that method 800 need not be performed in the exact sequence as shown, unless otherwise indicated; and likewise various blocks may be performed in parallel rather than in sequence; hence the elements of method 800 are referred to herein as "blocks" rather than "steps". It is also to be understood that method 800 can be implemented on variations of device 101 as well.

At block 801, device 101 receives customer records 333 and campaign data 337 from device 301. At block 803, processor 120 populates database 140 using customer records 333 and campaign data 337, for example, to populate statements 142 with first names, last names, and statements. At block 805, processor 120 automatically assembles one or more statements 142 from database 140 into one or more phrases to be recorded. At block 807, processor 120 associates instructions for applying linguistic rules with the one or more phrases, including where to insert pauses in the one or more phrases. At block 809, processor 120 stores, at memory 122, the recording plan comprising the one or more phrases in association with the instructions.

Method 800 will now be described with reference to FIGS. 9-16; with FIGS. 10 and 12 being substantially similar to FIG. 1, FIGS. 9 and 15 being substantially similar to FIG. 4, FIG. 11 being substantially similar to FIG. 2, and FIG. 16 being substantially similar to FIG. 3, with like elements having like numbers. It is furthermore assumed in FIGS. 9-16 that campaign data 337 comprises campaign data 537 to launch a campaign to encourage customers associated with end channels 307 to update a software license. In other implementations, campaign data 337 can comprise campaign data 637 to launch a campaign to encourage customers associated with end channels 307 to attend an event at store locations in their geographic location.

Figure 9:
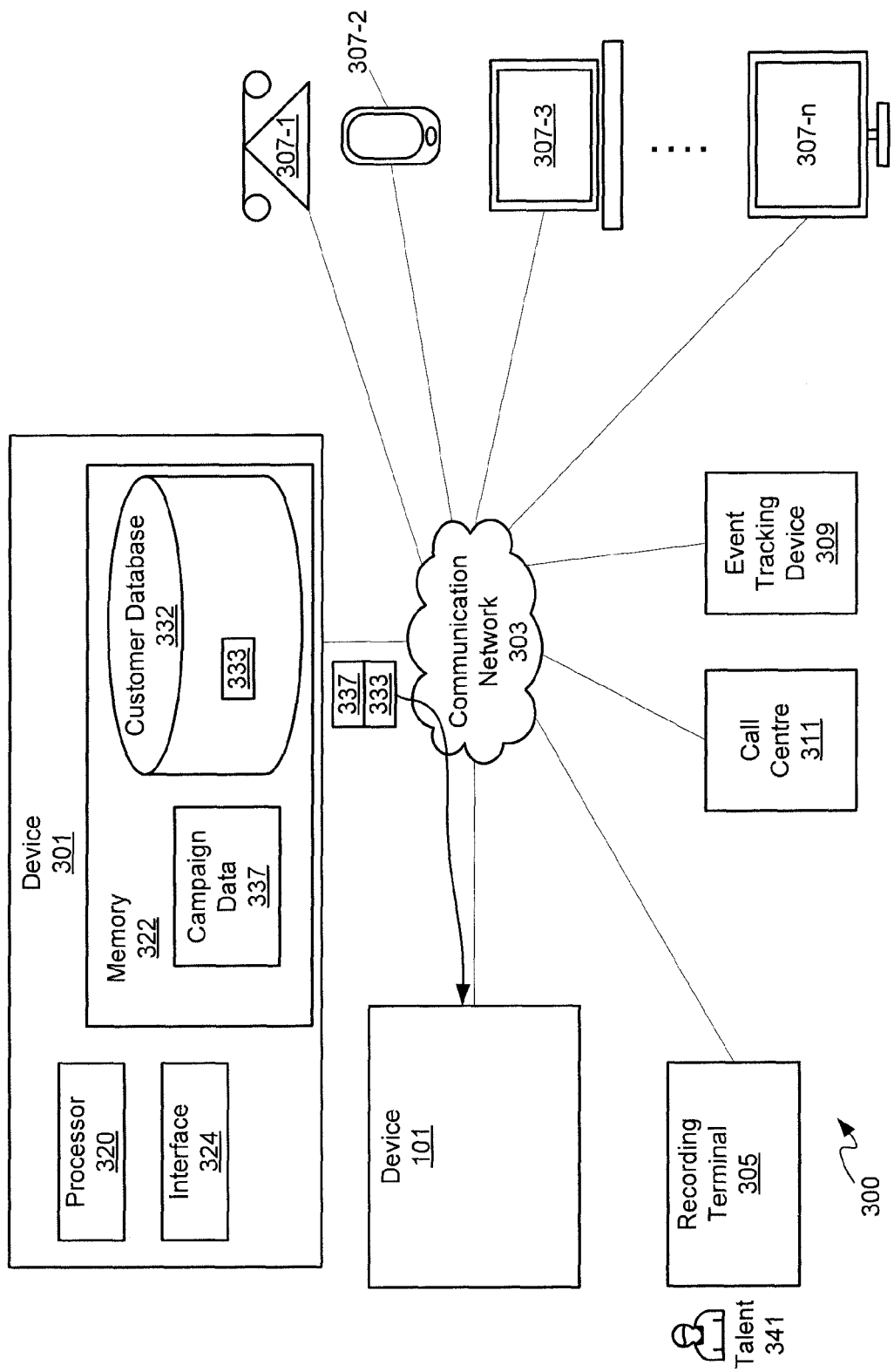
FIG. 9 depicts the system of FIG. 4 communicating customer records and campaign data to the device of FIG. 1, according to non-limiting implementations.

With reference to FIG. 9, device 101 receives customer records 333 and campaign data 337 from device 301 via network 303 (e.g. at block 801 of method 800). Alternatively, device 101 receives a portion of campaign data 337 and/or a portion of customer records 333 from device 301; for example, only those customer records 333 associated with customers who are to be reached in a given campaign (e.g. via a data driven dialog) can be received, and/or new customer records 333 can be received, presuming that previous customer records are already stored at device 101.

Similarly updated portions of campaign data 337 can be received at device 101 assuming that previous campaign data is already stored at device 101. In other words, in implementations, where device 101, receives a portion of campaign data 337 and/or a portion of customer records 333 from device 301, the received portion of campaign data 337 and/or the received portion of customer records 333 can comprise a delta, respectively, with previously received campaign data and/or previously received customer records 333.

Figure 10:
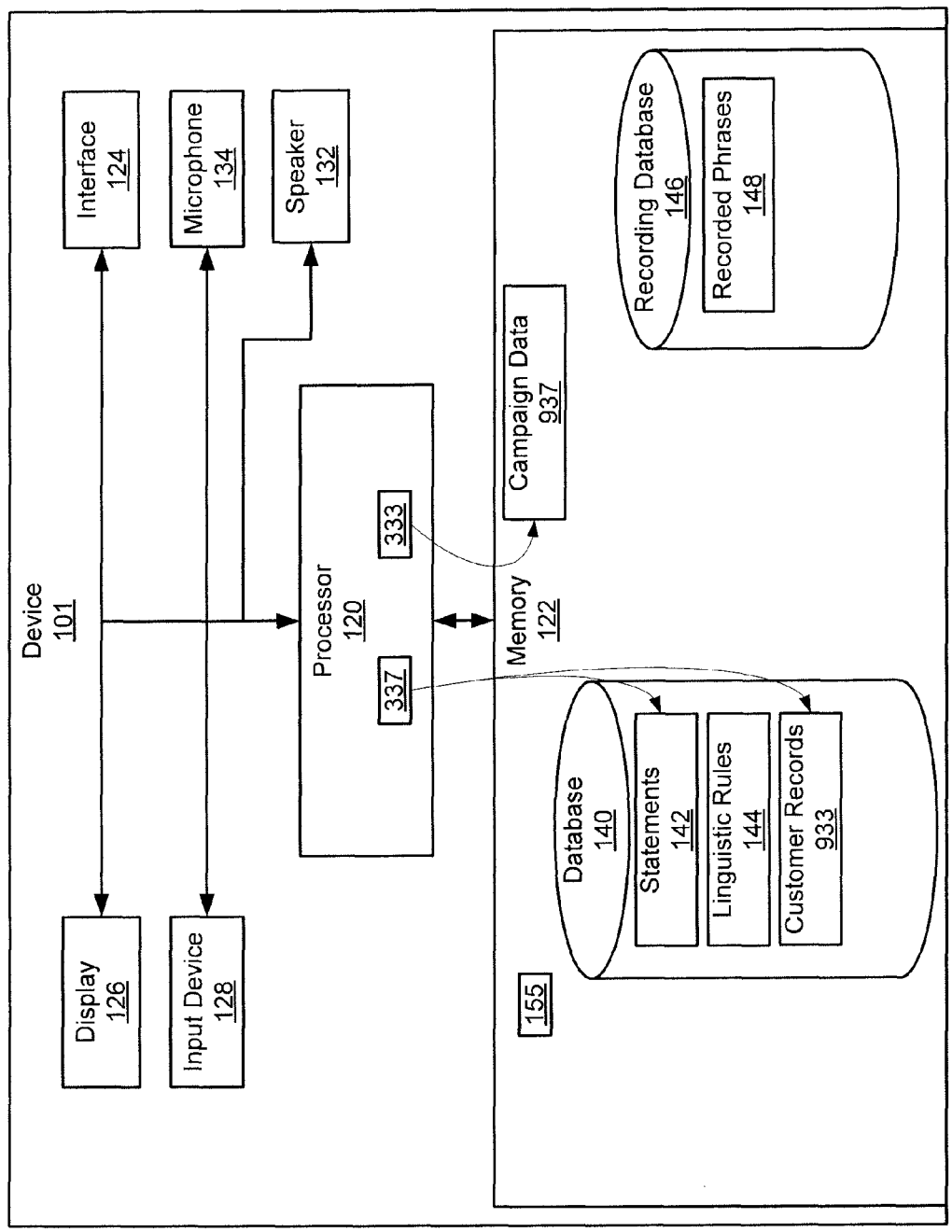
FIG. 10 depicts the device of FIG. 1 using the received customer records and the received campaign data to populate and/or update statements to be used in a recording plan and/or a data driven dialog, according to non-limiting implementations.

With reference to FIG. 10, processor 120 populates (e.g. at block 803 of method 800) statements 142 at database 140 with customer records 333 and/or campaign data 337 and/or portions thereof; furthermore, processor 120 can create and/or populate customer records 933 at database 140. Customer records 933 can be similar to customer records 333 as depicted in FIG. 2. Processor 120 can further store campaign data 337 as campaign data 937 at memory 122.

With reference to FIG. 11, processor 120 can populate and/or update statements 142 with campaign data 337 that is different from existing statements 142. For example, the following sentiment statements 207 "You are a valued customer, and always appreciate your confidence in our products" and "You are a long time customer, and we value your business" already exist in statements 142 as depicted in FIG. 2. However, these statements also exist in campaign data 337 (assuming campaign data 337 comprises campaign data 537): hence these statements are not added to statements 142; rather statements in campaign data 337 that are different from statements 142 are added to statements 142. Hence, FIG. 11 depicts statements 142 updated with statements from campaign data 337 that are different from existing statements in statements 142, including, but not limited to, supplementary data 213.

Figure 12:
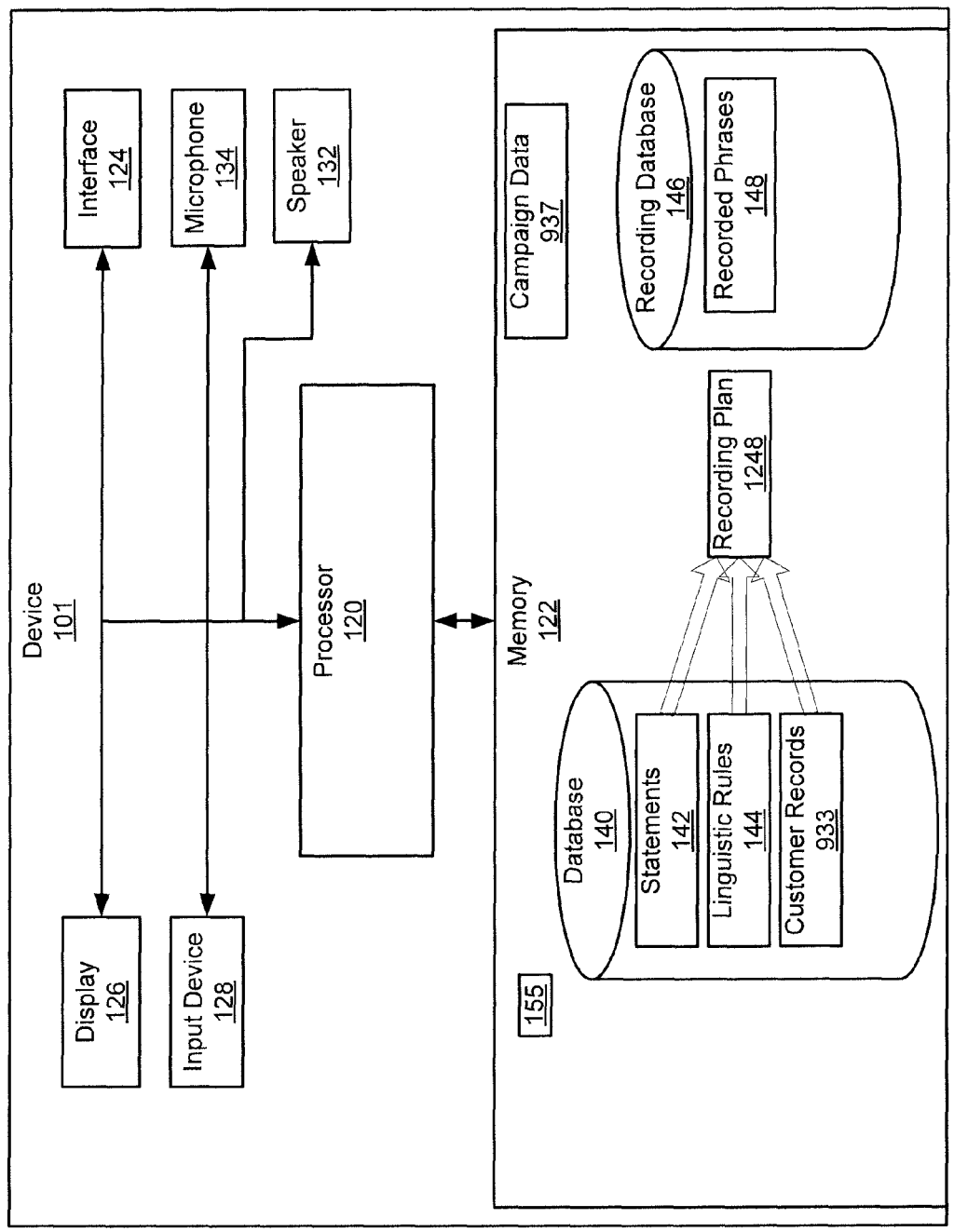
FIG. 12 depicts the device of FIG. 1 assembling a recording plan, according to non-limiting implementations.

With reference to FIG. 12, processor 120: automatically assembles one or more statements 142 from database 140 into one or more phrases to be recorded, and associates instructions for applying linguistic rules with the one or more phrases, including where to insert pauses in the one or more phrase (e.g. block 807 of method 800); and stores, at memory 122, a recording plan 1248 comprising the one or more phrases in association with the instructions (e.g. block 809 of method 800). In some non-limiting implementations, data from customer records 933 can be included in recording plan 1248, for example when not already included from statements 142 and/or linguistic rules 144; such data can include, but is not limited to, first names, last names, accent information, regional and/or geographical and/or location data, language preferences, profile data (e.g. customer profile data), and preference data (e.g. customer preference data).

Block 807 can include processor 120 determining that at least a portion of the one or more statements 142 in database 140 correspond to one or more of existing recorded phrases 148 in a recording database 146, and automatically assembling only the one or more of statements 142 from database 140 that do not correspond to one or more of the existing recorded phrases 148 into the one or more phrases to be recorded, along with associated linguistic rules. In other words, only those statements 142 which do not correspond to existing recorded phrases 148 are assembled into recording plan 1248.

For example, attention is next directed to FIG. 13 which depicts a non-limiting example of a recording plan 1348 generated by processor 120 implementing method 800. Recording plan 1248 can comprise recording plan 1348. Recording plan 1348 comprises a list of textual phrases to be recorded by a recording talent at terminal 305, including, but not limited to, human recording talent 341. As depicted, recording plan 1348 comprises one textual phrase per line, along with associated instructions for applying linguistic rules to the phrases, for example where to insert pauses, as indicated by the instruction [PAUSE]. The instructions can be generated automatically using linguistic rules 144.

For example, with reference to FIG. 2, linguistic rules 144 include rules for inserting pauses in phrases, such as "Insert pause after influence statements", "Insert brief pause after a comma", and "Insert brief pause after a semicolon". Hence, in these implementations, processor 120 can substitute the instruction [PAUSE] in recording instructions for commas and semicolons; in implementations, where a phrase to be recorded comprises an influence statement followed by another statement, the instruction [PAUSE] can be inserted there between.

However, in other implementations, the instructions can be edited and/or generated, by a user reviewing recording plan 1348 and applying linguistic rules to the phrases to be recorded; in these implementations, processor 120 can add such user generated instructions to recording plan 1348.

In depicted implementations, processor 120 can be further configured for: tagging one or more words in the one or more phrases as at least one of a sentiment based word, an emotional word, an emphasized word, and an accent to be used when recording the word; and, including in the instructions, directions to read each tagged word according to the tagging. For example, as described above, linguistic rules 144 comprises a list of words to be emphasized when present in the phrases to be recorded. In other words, database 140 comprises one or more tags associated with one or more words in statements 142, each of the one or more tags comprising a linguistic rule to apply to the one or more words: as depicted in FIG. 2, the phrase "Emphasize" preceding words "always", "value", "hope", "useful", "expire" and "calling" acts as a tag to indicate that the words in the list are to be emphasized when recorded.

Accordingly, these words are tagged with an asterisk ("*") in recording plan 1348, or the like, as words to be emphasized as they are one or more of sentiment based words, emotional words, emphasized words, and the like. In some implementations, the asterisk, or the like, can serve as a direction to read each tagged word according to the tagging, and/or explicit instructions can be included on how to read the tagged words ("[*=EMPHASIZE THESE WORDS]").

While as depicted a single tag type is used, in other implementations, more than one tag type can be used, for example to tag a word to be recorded sentimentally, emotionally, and the like.

Recording plan 1348 further comprises instructions on an accent to be used when recording the phrases, for example "[RECORD EACH PHRASE IN A WESTERN CANADIAN ACCENT]". These instructions can be received with and/or derived from campaign data 337 and/or derived from customer records 333 (e.g. based on addresses of customers) and/or added by a user editing recording plan 1348 using device 101 and/or processor 120. Such instructions effectively tag every word in phrases of recording plan 1348 to be recorded according to the indicated accent. While all words are tagged in recording plan 1348 to be recording in the indicated accent, in other implementations, only specific words can be tagged for recording in one or more given accents.

Similarly, attention is directed to FIG. 14, which depicts an alternative recording plan 1448, which is substantially similar to recording plan 1348, however each word is tagged for recording in an accent different from the accent of recording plan 1348 using the instruction "[RECORD EACH PHRASE IN A US MIDWESTERN ACCENT]", which can also be received with and/or derived from campaign data 337 and/or derived from customer records 333 (e.g. based on addresses of customers) and/or added by a user editing recording plan 1348 using device 101 and/or processor 120.

Recording plan 1248 can include both recording plan 1348 and recording plan 1448, with recorded phrases that result from implementing recording plan 1348 to be used in data driven dialogs for customers in western Canada, and recorded phrases that result from implementing recording plan 1448 to be used in data driven dialogs for customers in the American Midwest.

In general, the instructions recording plan 1248 that are based on linguistic rules, result in phrases in recording plan 1248 being recorded in natural speech pronunciation.

Figure 15:
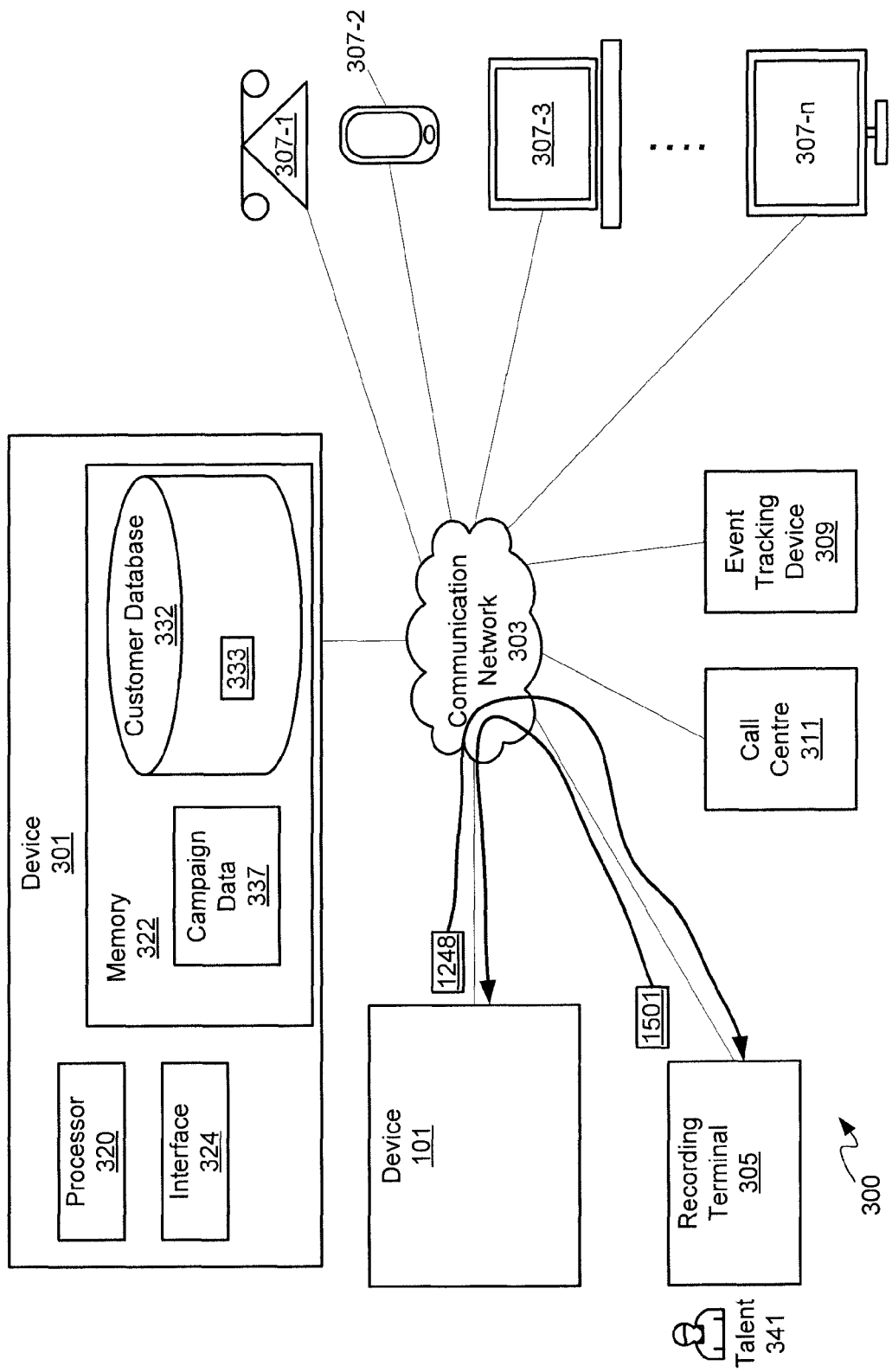
FIG. 15 depicts the device of FIG. 1 transmitting the recording plan to a recording terminal, and receiving recorded phrases in response, according to non-limiting implementations.

Attention is next directed to FIG. 15, which is substantially similar to FIG. 4, with like elements having like numbers. In FIG. 15, recording plan 1248 is transmitted to recording terminal 305 associated with a recording talent, for example upon generation of recording plan 1248. When recording plan 1248 comprises more than one recording plan 1348, 1448, each individual recording plan 1348, 1448 can be transmitted to different terminals 305; for example, a first recording terminal 305 can be associated with a first accent (e.g. a human recording talent who can speak the first accent, such as a western Canadian accent), and a second recording terminal 305 can be associated with a second accent (e.g. a human recording talent who can speak the first accent, such as an American Midwestern accent). Assigning a given recording plan 1348, 1448 to a given terminal 305 can occur manually and/or automatically using rules: for example, a network address (and the like) of each recording terminal 305 can be associated in a database (e.g. including but not limited to database 140) with a given accent, which can be associated in the database with a given geographic region (e.g. database data indicating a given accent can be associated with a given terminal 305 and/or a given geographic region in the database; alternatively, a given terminal 305 can be associated with a given geographic region in the database). When one or more addresses in customer database 933 are located in a given geographic region, a given recording plan 1348, 1448 is transmitted to an associated terminal 305 with optional instructions to record the phrases in the recording plan in the given accent.

In any event, recording plan 1248 received at terminal 305 is implemented by the associated recording talent, whether human or automated, and phrases corresponding to the phrases in recording plan 1248 are recorded, according to the instructions for implementing linguistic rules in recording plan 1248. Recorded phrases 1501 of the one or more phrases in recording plan 1248 are received at device 101, via interface 124, from terminal 305 (i.e. terminal 305 transmits recorded phrases 1501 to device 101 after the phrases are recorded and/or as each phrase is recorded).

As depicted in FIG. 16, recorded phrases 1501 are stored in recorded phrases 148 in recording database 146. In other words, FIG. 16 is substantially similar to FIG. 3, but updated with recorded phrases 1501. Recorded phrases 1501 can further be indexed according to each corresponding textual phrase in recording plan 1248; hence indexing of recorded phrases 148 can be correspondingly updated.

In general, recorded phrases 148 comprise components available for assembly into data driven dialogs as will be described hereafter; hence, recording database 140 comprises a voice library of recorded phrases that can be used to assemble the data driven dialogs.

It is further appreciated that method 800 can be repeated with campaign data 637, by receiving campaign data 637 at device 101.

Figure 17:
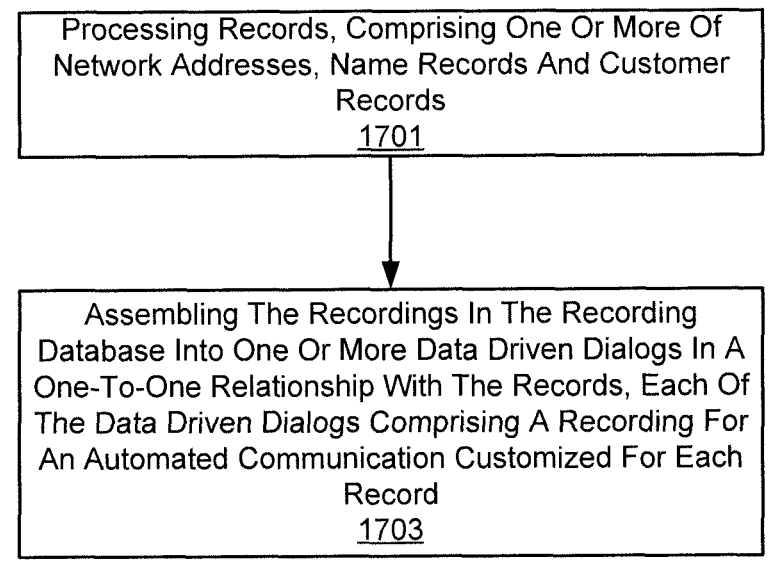
FIG. 17 depicts a flowchart of a block diagram of a method for assembling a data driven dialog, according to non-limiting implementations.

Attention is now directed to FIG. 17 which depicts a flowchart illustrating a method 1700 of assembling data driven dialogs, according to non-limiting implementations. In order to assist in the explanation of method 1700, it will be assumed that method 1700 is performed using device 101. Furthermore, the following discussion of method 1700 will lead to a further understanding of device 101 and its various components. However, it is to be understood that device 101 and/or method 1700 can be varied, and need not work exactly as discussed herein in conjunction with each other, and that such variations are within the scope of present implementations. It is appreciated that, in some implementations, method 1700 is implemented in device 101 by processor 120, for example by implementing application 155.

It is to be emphasized, however, that method 1700 need not be performed in the exact sequence as shown, unless otherwise indicated; and likewise various blocks may be performed in parallel rather than in sequence; hence the elements of method 1700 are referred to herein as "blocks" rather than "steps". It is also to be understood that method 1700 can be implemented on variations of device 101 as well.

At block 1701, processor 120 processes records, comprising one or more of name records and customer records, for example customer records 933; and at block 1703 assembles recorded phrases 148 in recording database 146 into one or more data driven dialogs in a one-to-one relationship with the records, each of the data driven dialogs comprising a recording for automated communications, an interactive voice response call, and the like, customized for each record.

Figure 18:
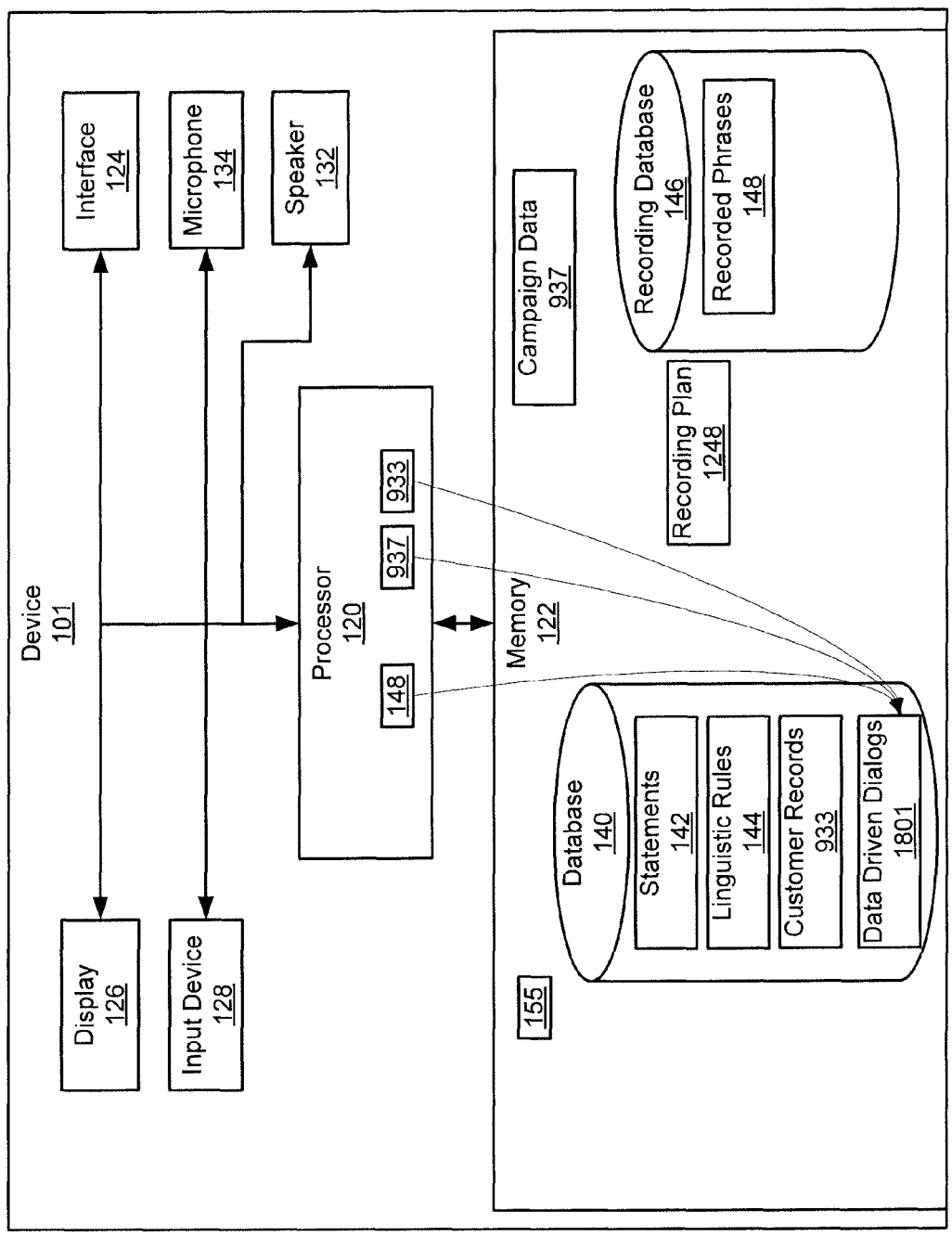
FIG. 18 depicts the device of FIG. 1 assembling data driven dialogs, according to non-limiting implementations.

Specifically, and with reference to FIG. 18, method 1700 results in processor 120 assembling recorded phrases 148, in recording database 146, customer records 933 and alternatively campaign data 937, into one or more data driven dialogs 1801, each of data driven dialogs 1801 comprising a customized recording for an automated communication, an interactive voice response call and/or an automated message and/or a recording to be played in an automated communication.

For example, each data driven dialog 1801 can be customized by one or more of: including a name stored in a respective record (e.g. of customer records 933) in each of the one or more data driven dialogs 1801; selecting a respective recorded phrase 148 from recording database 146 for each of the one or more data driven dialogs 1801 based on one or more fields associated with the respective record; each of the one or more fields can comprise at least one of (as described above): a geographic address associated with each customer, account numbers associated with each customer, a phone number associated with each customer, a "value" associated with each customer, a length of time that the customer has been engaged with the entity associated with device 301 and/or a first date of interactions between each customer and the entity associated with device 301, a most recent and/or "last" date of interactions between each customer and the entity associated with device 301, and a number of interactions between each customer and the entity associated with device 301, an expiry date of a product purchased by an associated customer from the entity associated with device 301, and the like.

Each data driven dialog 1801 can be assembled according to a format and/or template as follows: [Greeting Statement] [Sentiment Statement] [Influence Statement][Legal Statement], each portion of a data driven dialog 1801 assembled from recorded phrases 148 according to customer records 933 and statements stored in campaign data 937. As recorded phrases 148 have been recorded according to linguistic rules and are in natural speech pronunciation, the resulting data driven dialogs are also in natural speech pronunciation.

For example, attention is next directed to FIG. 19 which depicts a non-limiting example of data driven dialogs 1901 generated using method 1700 from customer records 933 and campaign data 937, presuming customer records 933 are similar to customer records 433 and presuming campaign data 937 is similar to campaign data 537. For example, data driven dialogs 1801 at device 101 can comprise data driven dialogs 1901 of FIG. 19. Each data driven dialog 1901 is indexed using an associated phone number as each data driven dialog 1901 will be delivered to the associated phone number; alternatively, each data driven dialog can be indexed using an associated internet protocol address, MAC (media access control) address and the like.

Hence, for example, for customer "Tara Kelly", having a phone number "4035551212", who is geographically located in Calgary, Alberta, Canada, and who is categorized as a "Valued" customer, a data driven dialog is assembled comprising: a greeting statement "Hi Tara, I'm calling from National Software in Detroit regarding your AlphaPro Software", a sentiment statement "You are a valued customer, and we always appreciate your confidence in our products", an influence statement "Your AlphaPro Software License is set to expire on Mar. 5, 2014. To extend your license please, press 1 now and a customer service representative will call you back within <TIME PERIOD>" and a legal statement "To opt out of future calls, call 4035554321". The legal statement is included in this example the jurisdiction of Alberta is assumed to legally require telephone solicitations to include an "opt-out" clause; whether a legal statement is to be included, or not, in a data driven dialog can be stored in database 140 and/or campaign data 937 and/or in any other suitable location. The phrases "Tara", "Mar. 5, 2014", are populated using data from Tara Kelly's customer record. Furthermore, the data driven dialog for Tara Kelly can be generated using recorded phrases 148 recorded in a western Canadian accent as "Tara Kelly" has an address in western Canada.

In other words, the data driven dialog for Tara Kelly is assembled using the template, with recorded phrases chosen from recorded phrases 148 according to data stored in a customer record 933 for Tara Kelly: as Tara Kelly is a "Valued" customer, the associated data driven dialog is targeted specifically to her, and optionally in an accent she is used to hearing.

Similarly, for customer "Claire Smith", having a phone number "3135551216", who is geographically located in Detroit, Mich., USA, and who is categorized as a "Long-time" customer, a data driven dialog is assembled comprising: a greeting statement "Hi Claire, I'm calling from National Software in Detroit regarding your AlphaPro Software", a sentiment statement "You are a long-time customer, and we value your business", an influence statement "Your AlphaPro Software License is set to expire on May 5, 2014. To extend your license please, press 1 now and a customer service representative will call you back within <TIME PERIOD>". There is no legal statement as, in this example, the jurisdiction of Michigan is assumed to not require such statements. The phrases "Claire", "May 5, 2014", are populated using data from Claire Smith's customer record. Furthermore, the data driven dialog for Claire Smith can be generated using recorded phrases 148 recorded in an American Midwest accent as "Claire Smith" has an address in the Midwestern United States.

In other words, the data driven dialog for Claire Smith is assembled using the template, with recorded phrases chosen from recorded phrases 148 according to data stored in a customer record 933 for Claire Smith: as Claire Smith is a "Long-time" customer, the associated data driven dialog is targeted specifically to her, and optionally in an accent she is used to hearing.

Similar data driven dialogs 1901 are generated for each customer record 933 and customized accordingly. In other words, each data driven dialog 1901 is generated in a one-to-one relationship with customer records 933. Hence, when customer records 333, 933 comprises thousands and/or millions of records, unique, customized data driven dialogs can be automatically generated for each record without intervention of a human user: as each recorded phrase 148 has been generated using linguistic rules, including, but not limited to, linguistic rules 144, each data driven dialog 1901 is also produced according to natural speech pronunciation.

It is further appreciated that device 101, can apply a portion of linguistic rules 144 when generating the data driven dialogs 1901, for example by inserting a pause after influence statements.

Furthermore, data driven dialogs for campaign data 637 can be produced in a similar manner, however, with geographic information, such a store location, a store manager's name, a day and/or date of an event, and the like, customized according to a geographic location of each customer.

Figure 20:
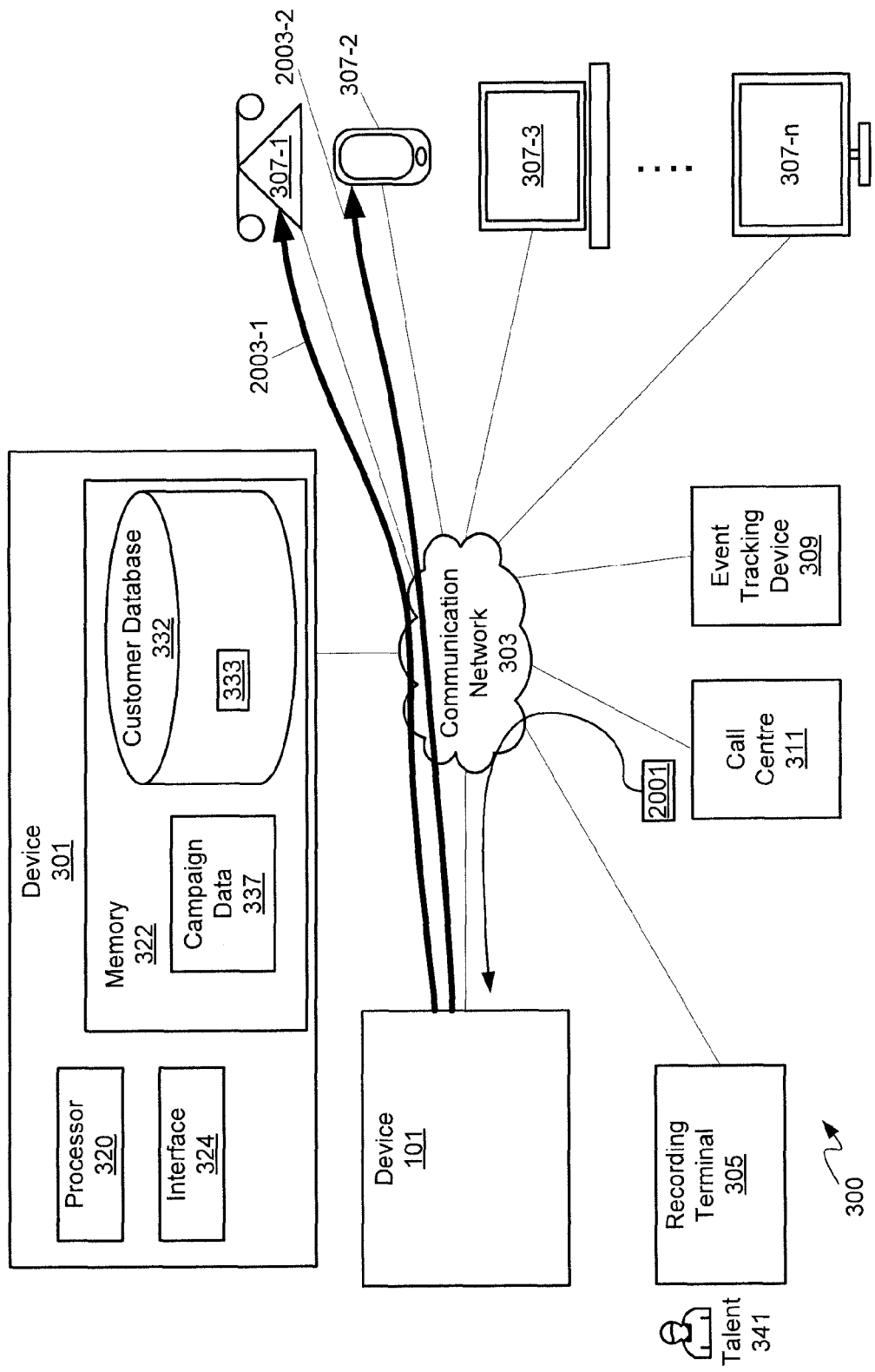
FIG. 20 depicts the system of FIG. 4, in which data driven dialogs are delivered to end channels, according to non-limiting implementations.

Attention is next directed to FIG. 20, which is substantially similar to FIG. 4, with like elements having like numbers, and depicts device 101 calling end channels 307-1, 307-2 to deliver one or more data driven dialogs 1801; such an implementation assumes that a campaign to deliver data driven dialogs 1801 is implemented at device 101, and assumes that device 101 comprises apparatus for automatically initiating calls to deliver data driven dialogs 1801: hence, in these implementations, device 101 comprise an automated communication system which can include, but is not limited to, an interactive voice messaging system.

Alternatively, data driven dialogs 1801 can be transmitted to, and/or accessed by call centre 311 and/or device 301, and calls to end channels 307 can be initiated from call centre 311 and/or device 301.

As depicted, however, device 101 can request a current wait time period from call centre 311, and call centre 311 can transmit current wait time period data 2001 to device 101, which used current wait time period data 2001 to populate the <TIME PERIOD> field in data driven dialogs 1801. Alternatively wait time period data 2001 can be requested and received during calls to deliver data driven dialogs 1801.

In FIG. 20, device 101 is depicted as initiating calls 2003-1, 2003-2 to end channels 307-1, 307-2, for example using phone numbers in customer records 933: in particular a data driven dialog 1801 generated for a given customer is delivered to the customer by: initiating a call 2003-1, 2003-2 to an end channel 307 associated with the given customer (as identified via phone number), and playing a data driven dialog 1801 over the call. A schedule for initiating calls 2003-1, 2003-2 can be generated using any process, for example based on expiry dates stored in customer records 933, and/or by staggering calls according to time of day in a given geographic location, network loads and the like. Calls 2003-1, 2003-2 will be interchangeably referred to hereafter collectively as calls 2003, and generically as a call 2003.

While FIG. 20 depicts only two calls 2003, any number of calls 2003 for delivering data driven dialogs 1801 can be made, for example a call 2003 for each data driven dialog 1801 to any number of end channels 307. When an end channel 307 is busy and/or does not pick up a given call 2003, the given call 2003 can be repeated at a later time.

Each call 2003 can result in several actions by a customer at an end channel 307: the user can terminate a call 2003 by hanging up; the user can press "1" to be transferred to call centre 311 and/or to have a CSR call the user back within a time period indicated within a data driven dialog; and/or a user can engage other media and/or channels associated with the entity associated with device 301, such as a website associated with the entity.

Figure 21:
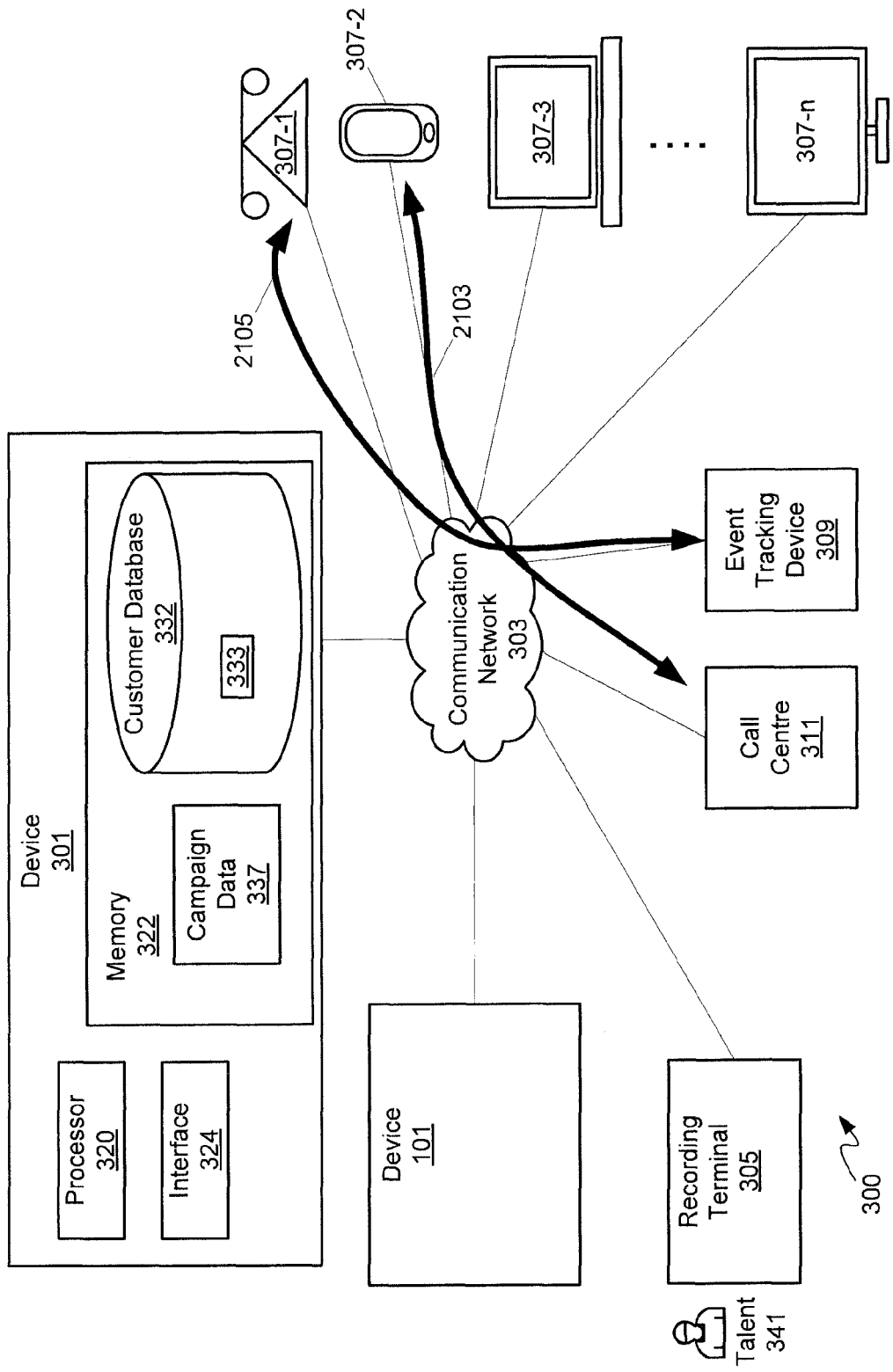
FIG. 21 depicts the system of FIG. 4, in which an end channel connects to a call centre and another end channel interacts with an event tracking device, according to non-limiting implementations.

As depicted in FIG. 21, which is substantially similar to FIG. 4, with like elements having like numbers, call 2003-1 was terminated before "1" was pressed, and call 2003-2 resulted in another call 2103 between end channel 307-2 and call centre 311.

A customer associated with end channel 307-1 can, however, have accessed a website associated with the entity associated with device 301, as identified on call 2003-1, and that interaction 2105 with the website can be tracked using cookies stored at the device used to access the website (which can include, but is not limited to end channel 307-1, but can also be a completely different device), and the like, by event tracking device 309; in these implementations, event tracking device 309 can comprise a server hosting a website for the entity associated with device 301 and/or a server for selling products and/or renewing licenses for products associated with the entity. In other words, while call 2003-1 was terminated before "1" was pressed, call 2003-1 can still result in an action that benefits the entity: the customer going to the entity's website to buy a product and/or renew a license, and the like.

Figure 22:
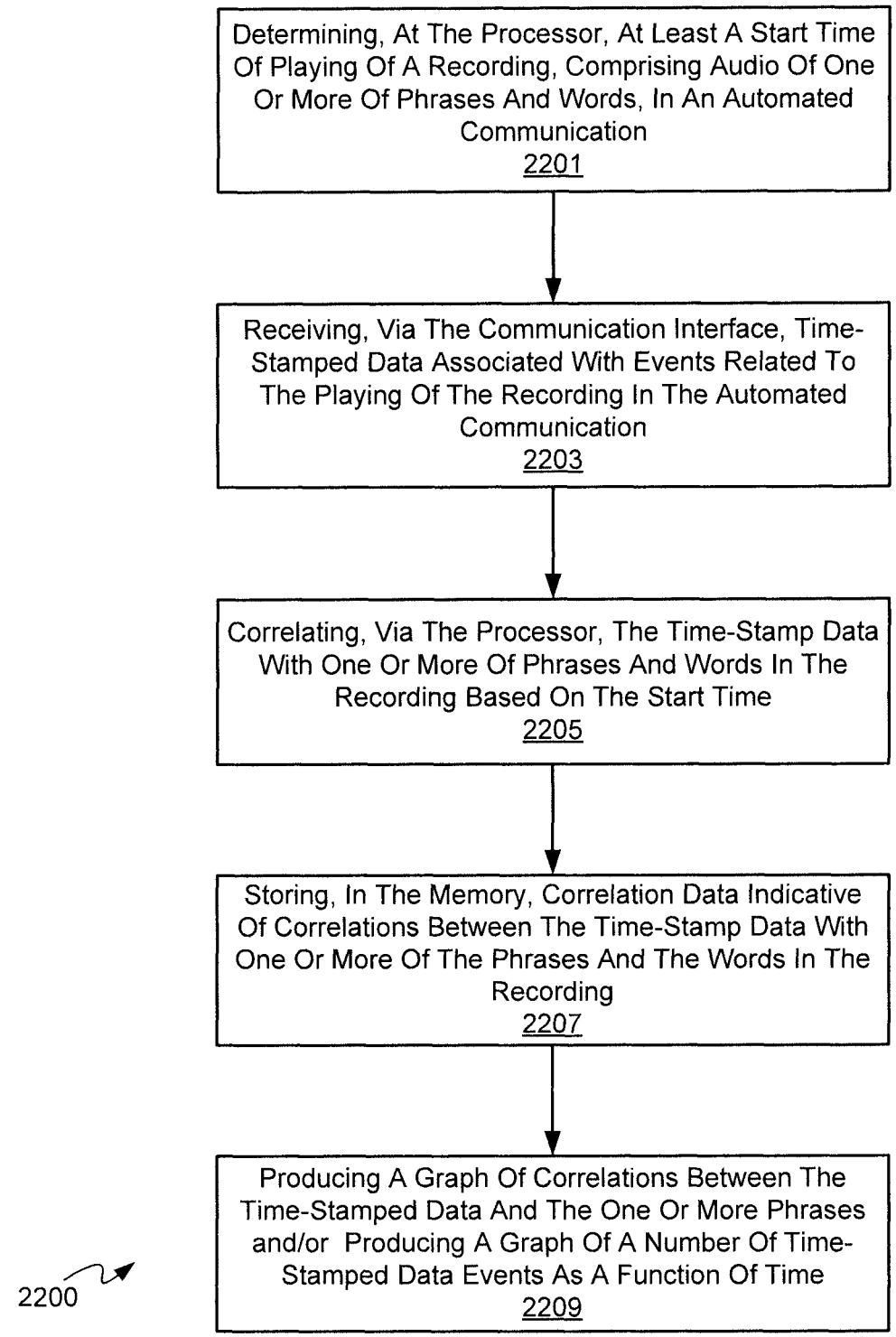
FIG. 22 depicts a flowchart of a block diagram of a method for correlating time-stamped data with one or more of phrases and words in a recording, according to non-limiting implementations.

Attention is now directed to FIG. 22 which depicts a flowchart illustrating a method 2200 of correlating time-stamped data with one or more of phrases and words in a recording, according to non-limiting implementations. In order to assist in the explanation of method 2200, it will be assumed that method 2200 is performed using device 101. Furthermore, the following discussion of method 2200 will lead to a further understanding of device 101 and its various components. However, it is to be understood that device 101 and/or method 2200 can be varied, and need not work exactly as discussed herein in conjunction with each other, and that such variations are within the scope of present implementations. It is appreciated that, in some implementations, method 2200 is implemented in device 101 by processor 120, for example by implementing application 155.

It is to be emphasized, however, that method 2200 need not be performed in the exact sequence as shown, unless otherwise indicated; and likewise various blocks may be performed in parallel rather than in sequence; hence the elements of method 2200 are referred to herein as "blocks" rather than "steps". It is also to be understood that method 2200 can be implemented on variations of device 101 as well.

It is further assumed in method 2200 that device 101 (and/or any device that originates calls 2003) comprises a clock device so that a start time (e.g. a time of day) of a call 2003 can be determined; it is further assumed in method 2200 a length of each data driven dialog 1801 can be determined and/or is known, for example when processor 120 generates each data driven dialog 1801.

At block 2201, processor determines at least a start time of playing of a recording, for example a data driven dialog 1801, comprising audio of one or more of phrases and words, in an automated communication. At block 2203, processor 120 receives, via communication interface 124, time-stamped data associated with events related to the playing of the recording in the automated communication. At block 2205, processor 120 correlates the time-stamped data with one or more of phrases and words in the recording based on the start time. At block 2207, processor 120 stores, in memory 122, correlation data indicative of correlations between the time-stamped data with one or more of the phrases and the words in the recording. At an optional block 2209, processor 120 produces: a graph of correlations between the time-stamped data and the one or more phrases and/or a graph of a number of time-stamped data events as a function of time.

Further, while method 2200 can be implemented using data driven dialogs 1801, method 2200 can alternatively be applied to any recordings for which time-stamped data associated therewith can be determined and/or received and/or generated. For example, in method 2200, the recording can comprise one or more of: an automated communication recording, an audio recording, an interactive voice call recording, a video recording, streaming data, avatar data, and browser data; and the automated communication can comprise one or more of: an interactive voice call, a video call, and a communication in a browser environment. Hence, recordings and/or data driven dialogs can alternatively be provided at browsers, within the context of an avatar and/or a video and/or an audio event and/or streaming audio, and events associated therewith tracked and correlated with the recordings and/or data driven dialogs.

Further, the time-stamped data can comprise one or more of: hang-ups in an interactive voice call, receipt of data at a website associated with the automated communications, a call to a call centre associated with the automated communications, and the like.

Figure 23:
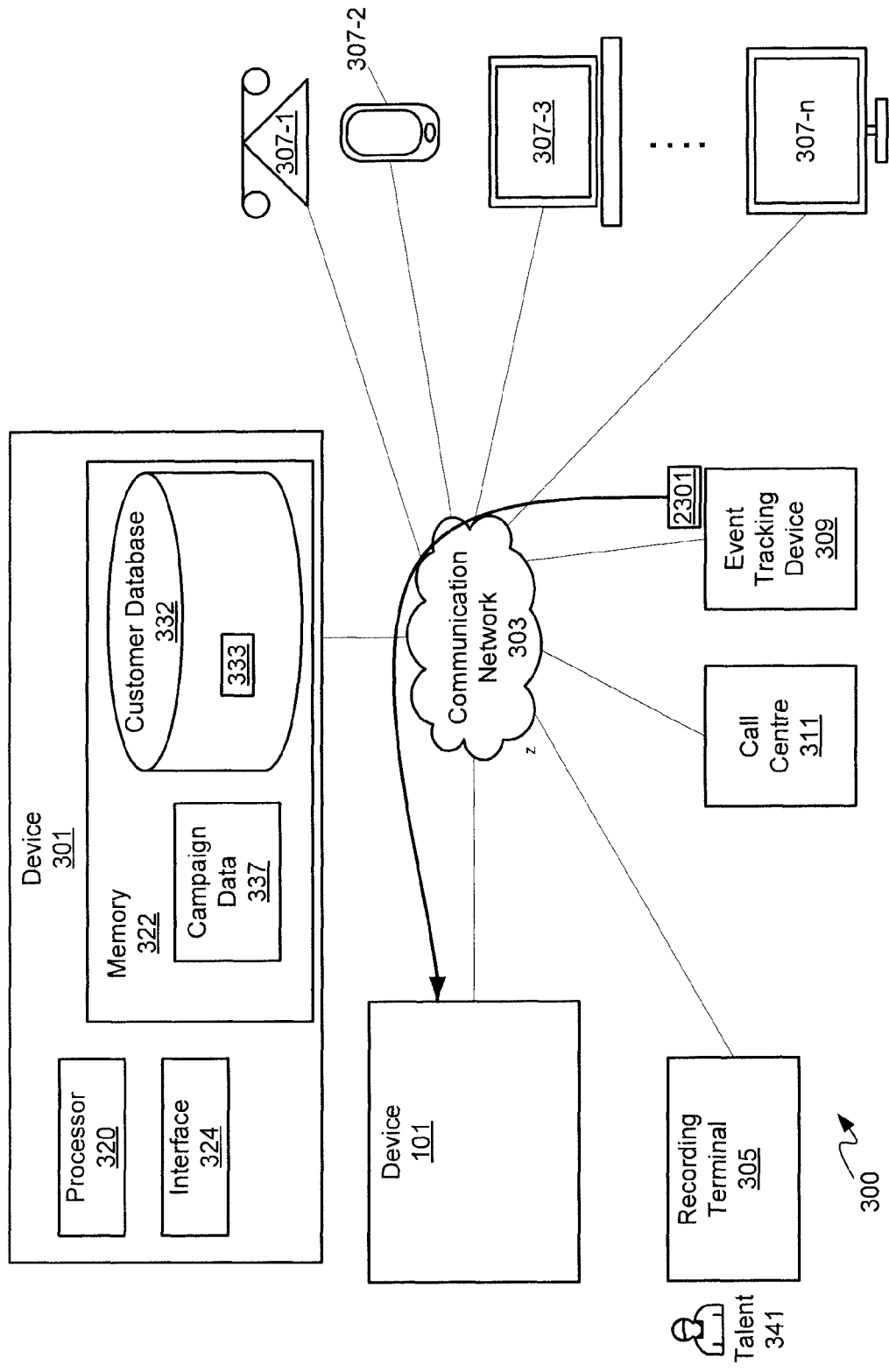
FIG. 23 depicts time-stamped data being received at the device of FIG. 1, within the system of FIG. 4, according to non-limiting implementations.

For example, attention is next directed to FIG. 23 which is similar to FIG. 4, with like elements having like numbers, and where time-stamped data 2301 is depicted as being transmitted to device 101 from event tracking device 309, for example, in response to device 101, and the like, playing of a recording (e.g. a data driven dialog 1801), comprising audio of one or more of phrases and words, in an automated communication, including, but not limited to, placing a call 2003 as described above. For example, time-stamped data 2301 can comprise a time a website was accessed in response to a call 2003 to a given end channel 307, an association there between determined from cookies, and/or other identifying information received at event tracking device 309; in some implementations, whenever an event occurs at event tracking device 309 associated with customer records 433, 933 (assuming event tracking device 309 comprises a web server), event tracking device 309 can transmit time-stamped data 2301 comprising a time of the event.

Alternatively, time-stamped data can be generated at device 101 and/or a device where calls 2003 originated, when time-stamped data comprises a time a call 2003 was terminated (e.g. hang-ups on calls 2003 are tracked).

Figure 24:
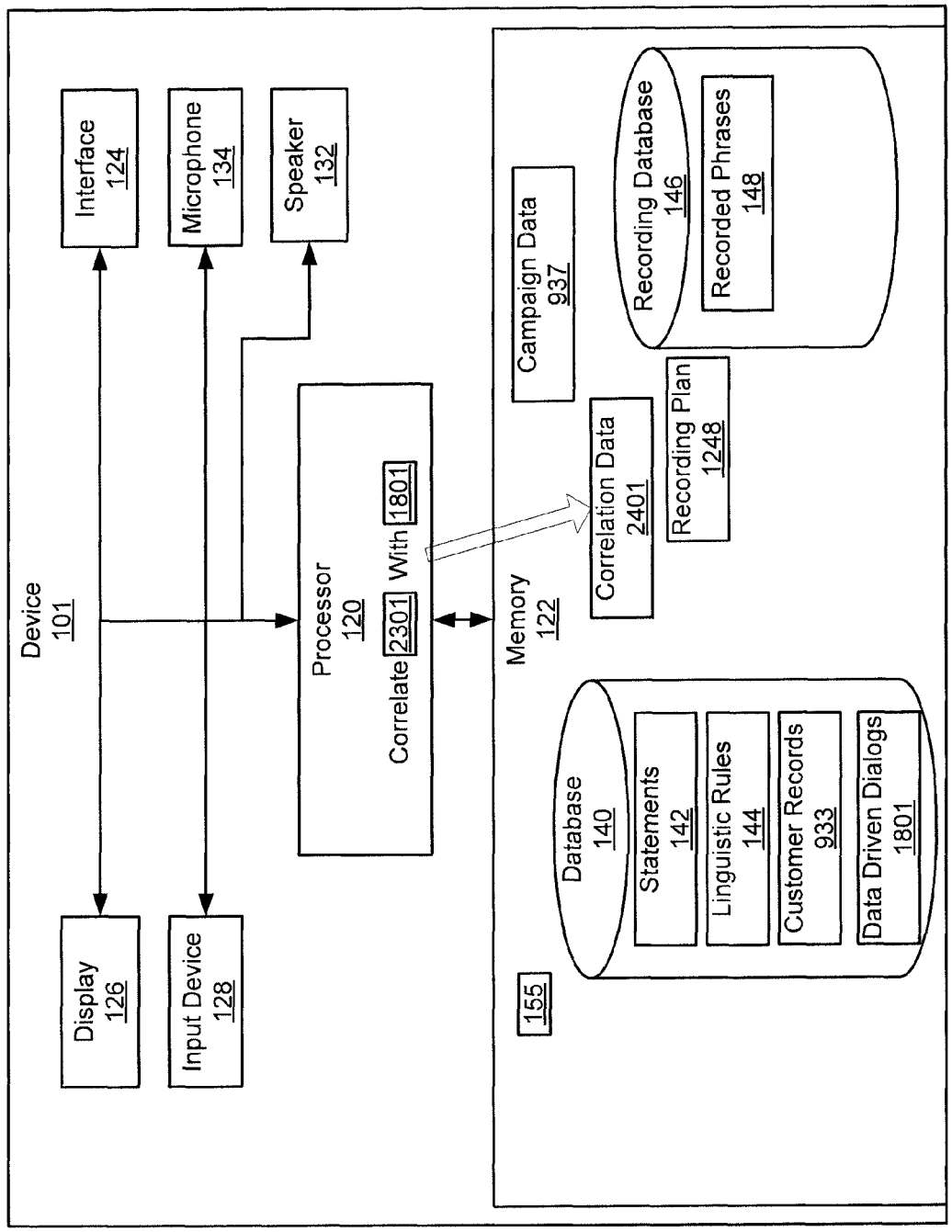
FIG. 24 depicts the device of FIG. 1 producing correlation data to correlate time-stamped data with one or more of phrases and words in a recording, according to non-limiting implementations.

Attention is next directed to FIG. 24, which is substantially similar to FIG. 18, with like elements having like numbers; however FIG. 24 depicts processor 120 generating correlation data 2401 by correlating time-stamped data 2301 with one or more data driven dialogs 1801. Hence, for example, times of hang-ups on calls can be correlated with times particular statements were provided on calls 2003. Alternatively, web-site accesses can be correlated with times of calls 2003. Events recorded in time-stamped data 2301 can be indexed according to when given words and/or phrases and/or statements were provided in recordings.

Figure 25:
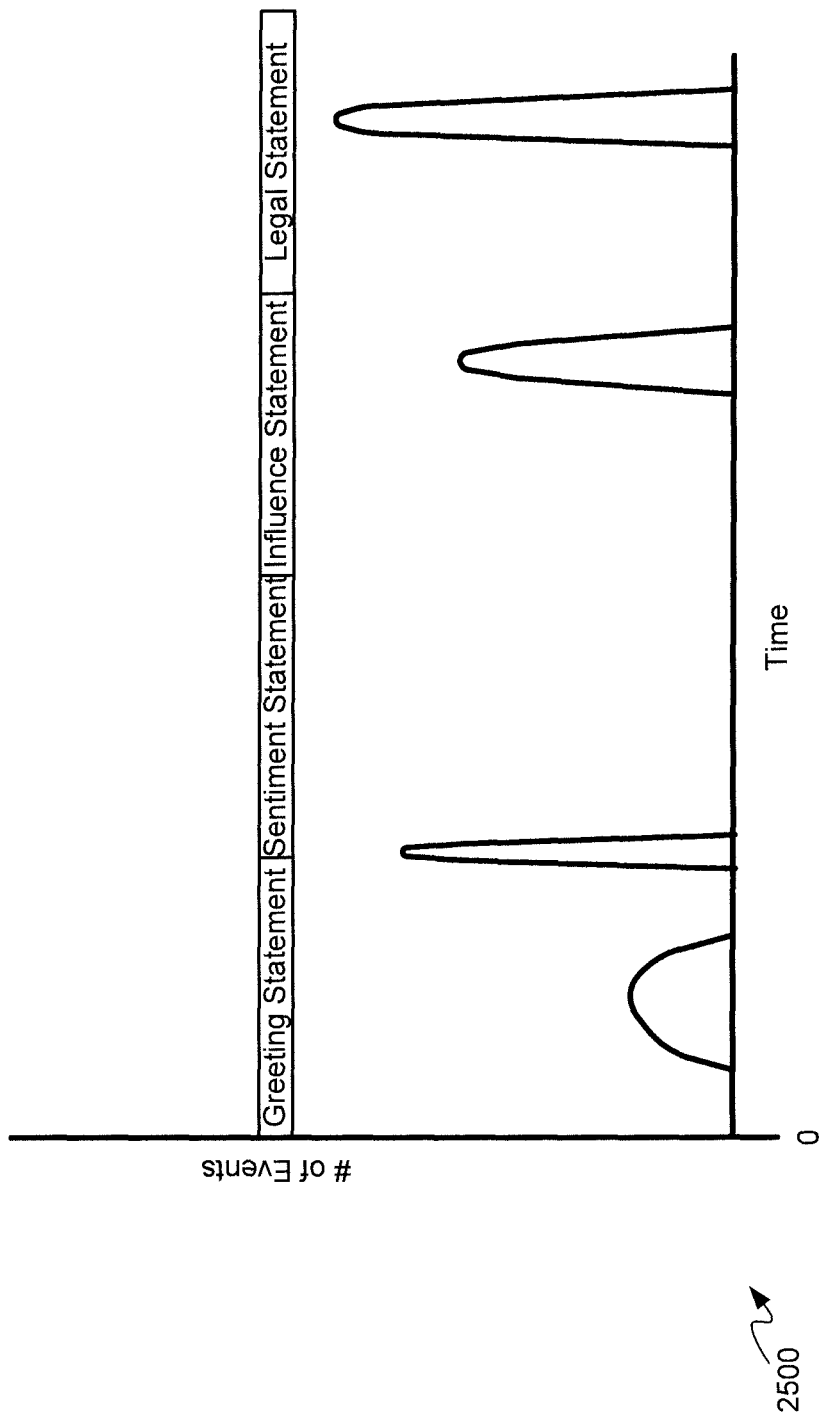
FIG. 25 depicts an example of a graph of events as a function of time in a recording, according to non-limiting implementations.

For example, attention is next directed to FIG. 25 which depicts a graph 2500 of graph of numbers of events associated with a recording as a function of time, the event correlated with a start time ("0") of a recording and/or a data driven dialog. To further illustrate this, approximate blocks of times that a greeting statement, a sentiment statement, an influence statement and a legal statement were played within a data driven dialog are indicated.

Hence graph 2500 can comprise a graph of correlations between time-stamped data 2401 and the one or more phrases, graph 2500 showing when events associated with time-stamped data 2401 occurred in relation to a time of each statement in a data driven dialog.

Alternatively, graph 2500 comprises a graph of a number of time-stamped data events as a function of time.

For example, when the events comprise hang-ups on calls 2003, graph 2500 shows when those hang-ups occurred: the bump close to "0" hence shows that some customers hung up during a greeting statement, while a larger number hung up at the beginning of a given sentiment statement; a smaller number hung-up during the influence statement, for example by pressing "1", and a large number listened through to the legal statement. In this manner, hang-ups can be correlated with given statement types to identify which statements holds the attention of customers and which statements cause customers to hang up.

Further, graphs similar to graph 2500 can be generated for each type of data driven dialog, for example all data driven dialogs in a campaign that contain the same value based greeting statement and/or the same value based sentiment statement and/or the same value based influence statement. Hence, the effectiveness of each statement in data driven dialogs can be tracked.

Furthermore, the time access of graph 2500, and similar, can extend beyond a length of associated recordings, for example to track website activity, and the like, that occurs after a recording is played.

Provided herein is a system which assembles a recording plan according to linguistic rules, causes recordings of phrases in the recording plan to be recorded, and assembles data driven dialogs from the recordings in a one-to-one relationship with records in a customer database, the data driven dialogs comprising recordings to be deployed in a messaging system. For example, each data driven dialog is automatically customized for a given customer based on one or more customer fields in a customer database including, but not limited to, fields related to a value of the customer to an entity, such as a business, and a length of time that the customer has been engaged with the entity. Furthermore, the effectiveness of the data driven dialogs can be tracked using time-stamped data generated in response to delivering the data driven dialogs to end channels.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A method comprising:
   at a device comprising a processor, a communication interface, and a memory storing statements for use in an automated communication:
   automatically assembling, using the processor, one or more of the statements into one or more phrases to be recorded;
   transmitting, from the communication interface to a recording talent terminal, a recording plan comprising the one or more phrases and instructions for applying linguistic rules to the one or more phrases;
   receiving, at the communication interface from the recording talent terminal, recorded phrases corresponding to the one or more phrases; and,
   assembling the recorded phrases into one or more data driven dialogs, in a one-to-one relationship with records, each of the data driven dialogs comprising a recording for the automated communication customized for each of the records, the records comprising one or more of network addresses, name records and customer records,
   wherein the automated communication comprises an output to one or more devices associated with the records, the output comprising the recording customized for each of the records.

2. The method of claim 1, wherein the linguistic rules include where to insert pauses in the one or more phrases.

3. The method of claim 1, wherein the statements comprise one or more of first names, last names, greeting statements, sentiment statements, influence statements, call to action statements, and legal statements.

4. The method of claim 1, further comprising: storing, at the memory, the recording plan in association with the instructions; and storing the recorded phrases in a recording database.

5. The method of claim 1, further comprising:
   tagging one or more words in the one or more phrases as at least one of a sentiment based word, an emotional word, an emphasized word, and an accent to be used when recording the word; and,
   including in the instructions, directions to read each tagged word according to the tagging.

6. The method of claim 1, wherein the statements are stored in a database comprising one or more tags associated with one or more words in the statements, each of the one or more tags comprising a linguistic rule to apply to the one or more words.

7. The method of claim 6, further comprising:
   determining that at least a portion of the one or more statements in the database correspond to one or more of existing recorded phrases in a recording database,
   the automatically assembling comprising automatically assembling only the one or more of the statements from the database that do not correspond to the one or more of the existing recorded phrases into the one or more phrases to be recorded, along with associated linguistic rules.

8. The method of claim 1, further comprising storing the recorded phrases at a voice library.

9. The method of claim 1, wherein the recording talent terminal comprises one or more of a human recording talent terminal and an automated recording talent terminal.

10. The method of claim 1, wherein customization of the one or more data driven dialogs for each of the records comprises one or more of:
including a name stored in a respective record in each of the one or more data driven dialogs; and,
selecting a respective recorded phrase for each of the one or more data driven dialogs based on one or more fields associated with the respective record.

11. A device comprising:
a processor, a communication interface, and a memory storing statements for use in an automated communication, the processor configured to:
automatically assemble one or more of the statements into one or more phrases to be recorded;
transmit, from the communication interface to a recording talent terminal, a recording plan comprising the one or more phrases and instructions for applying linguistic rules to the one or more phrases;
receive, at the communication interface from the recording talent terminal, recorded phrases corresponding to the one or more phrases; and,
assemble the recorded phrases into one or more data driven dialogs, in a one-to-one relationship with records, each of the data driven dialogs comprising a recording for the automated communication customized for each of the records, the records comprising one or more of network addresses, name records and customer records,
wherein the automated communication comprises an output to one or more devices associated with the records, the output comprising the recording customized for each of the records.

12. The device of claim 11, wherein the linguistic rules include where to insert pauses in the one or more phrases.

13. The device of claim 11, wherein the statements comprise one or more of first names, last names, greeting statements, sentiment statements, influence statements, call to action statements, and legal statements.

14. The device of claim 11, wherein the processor is further configured to: store, at the memory, the recording plan in association with the instructions; and store the recorded phrases in a recording database.

15. The device of claim 11, wherein the processor is further configured to:
tag one or more words in the one or more phrases as at least one of a sentiment based word, an emotional word, an emphasized word, and an accent to be used when recording the word; and,
include in the instructions, directions to read each tagged word according to the tagging.

16. The device of claim 11, wherein the statements are stored in a database comprising one or more tags associated with one or more words in the statements, each of the one or more tags comprising a linguistic rule to apply to the one or more words.

17. The device of claim 16, wherein the processor is further configured to:
determine that at least a portion of the one or more statements in the database correspond to one or more of existing recorded phrases in a recording database; and,
automatically assemble the one or more of the statements into one or more phrases by automatically assembling only the one or more of the statements from the database that do not correspond to the one or more of the existing recorded phrases into the one or more phrases to be recorded, along with associated linguistic rules.

18. The device of claim 11, wherein the processor is further configured to store the recorded phrases at a voice library.

19. The device of claim 11, wherein the processor is further configured to customize the one or more data driven dialogs for each of the records by one or more of:
including a name stored in a respective record in each of the one or more data driven dialogs; and,
selecting a respective recorded phrase for each of the one or more data driven dialogs based on one or more fields associated with the respective record.

20. A non-transitory computer-readable medium storing a computer program, wherein execution of the computer program is for:
at a device comprising a processor, a communication interface, and a memory storing statements for use in an automated communication:
automatically assembling, using the processor, one or more of the statements into one or more phrases to be recorded;
transmitting, from the communication interface to a recording talent terminal, a recording plan comprising the one or more phrases and instructions for applying linguistic rules to the one or more phrases;
receiving, at the communication interface from the recording talent terminal, recorded phrases corresponding to the one or more phrases; and, assembling the recorded phrases into one or more data driven dialogs, in a one-to-one relationship with records, each of the data driven dialogs comprising a recording for the automated communication customized for each of the records, the records comprising one or more of network addresses, name records and customer records,
wherein the automated communication comprises an output to one or more devices associated with the records, the output comprising the recording customized for each of the records.

* * * * *